US012672176B2

(12) United States Patent
Chen et al.

(10) Patent No.: US 12,672,176 B2
(45) Date of Patent: Jun. 30, 2026

(54) PAIRING METHOD AND APPARATUS

(71) Applicant: HUAWEI TECHNOLOGIES CO., LTD., Shenzhen (CN)

(72) Inventors: Jing Chen, Shanghai (CN); Yong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 18/477,144

(22) Filed: Sep. 28, 2023

(65) Prior Publication Data

US 2024/0023175 A1     Jan. 18, 2024

Related U.S. Application Data

(63) Continuation of application No. PCT/CN2021/083641, filed on Mar. 29, 2021.

(51) Int. Cl.
*H04W 76/10* (2018.01)
*H04W 12/041* (2021.01)
*H04W 12/069* (2021.01)
*H04W 12/50* (2021.01)

(52) U.S. Cl.
CPC ......... *H04W 76/10* (2018.02); *H04W 12/041* (2021.01); *H04W 12/069* (2021.01); *H04W 12/50* (2021.01)

(58) Field of Classification Search
CPC ... H04W 76/10; H04W 12/50; H04W 12/069; H04W 12/0431; H04W 12/041
See application file for complete search history.

(56) References Cited

U.S. PATENT DOCUMENTS

| | | | |
|---|---|---|---|
| 10,187,908 B2 * | 1/2019 | Gärdenfors | ........... H04W 76/14 |
| 2018/0270050 A1 | 9/2018 | Ohtani et al. | |

FOREIGN PATENT DOCUMENTS

| | | |
|---|---|---|
| CN | 101347029 A | 1/2009 |
| CN | 105101048 A | 11/2015 |
| CN | 105281809 A | 1/2016 |
| CN | 111066335 A | 4/2020 |

OTHER PUBLICATIONS

Bluetooth Core Specification Version 5.2. https://www.bluetooth.com/specifications/specs/core-specification-5-2/ Publication date: Dec. 31, 2019. (Year: 2019).*

* cited by examiner

*Primary Examiner* — Tuan H Nguyen
(74) *Attorney, Agent, or Firm* — WOMBLE BOND DICKINSON (US) LLP

(57)     ABSTRACT

Embodiments of this application provide a pairing method and apparatus, applied to the field of communications technologies and the field of connected vehicles. The method includes: A first node sends a first message, where the first message includes indication information of at least one pairing method supported by the first node; and receives a second message from a second node, where the second message includes indication information of a first pairing method, and the first pairing method is included in a pairing method supported by both the first node and the second node. According to embodiments of this application, the two nodes may support a plurality of pairing methods, so that the first pairing method is agreed on from the plurality of pairing methods, thereby improving node pairing flexibility.

19 Claims, 13 Drawing Sheets

```
┌─────────────┐                              ┌─────────────┐
│  First node │                              │ Second node │
└─────────────┘                              └─────────────┘
       │                                             │
       │   Determine that there is a prime number p  │
       │◄────────── and a number once g ────────────►│
       │                                             │
       │              ┌──────────────────────────────────────┐
       │              │  1: Determine a number once a         │
       │              └──────────────────────────────────────┘
       │              ┌──────────────────────────────────────┐
       │              │  2: Generate a first calculated value A,│
       │              │     where A=g^a mod p                 │
       │              └──────────────────────────────────────┘
       │   3: Send the first calculated value A to   │
       │◄────────────── the first node ──────────────│
       │                                             │
┌──────────────────────────────────────┐            │
│  4: Determine a number once b         │            │
└──────────────────────────────────────┘            │
┌──────────────────────────────────────┐            │
│  5: The first node obtains a second   │            │
│  calculated value B through calculation,│          │
│  where B=g^b mod p                    │            │
└──────────────────────────────────────┘            │
┌──────────────────────────────────────┐            │
│  6: Determine a key s, where s=A^b mod p│          │
└──────────────────────────────────────┘            │
       │   7: Send the second calculated value B to the│
       │──────────────── second node ───────────────►│
       │                                             │
       │              ┌──────────────────────────────────────┐
       │              │ 8: Determine a key s, where s=B^a mod p│
       │              └──────────────────────────────────────┘
```

FIG. 1

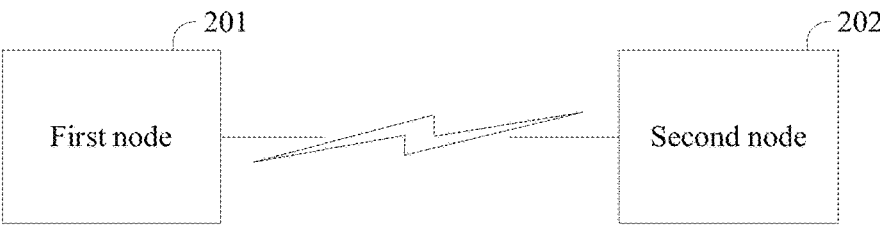

FIG. 2

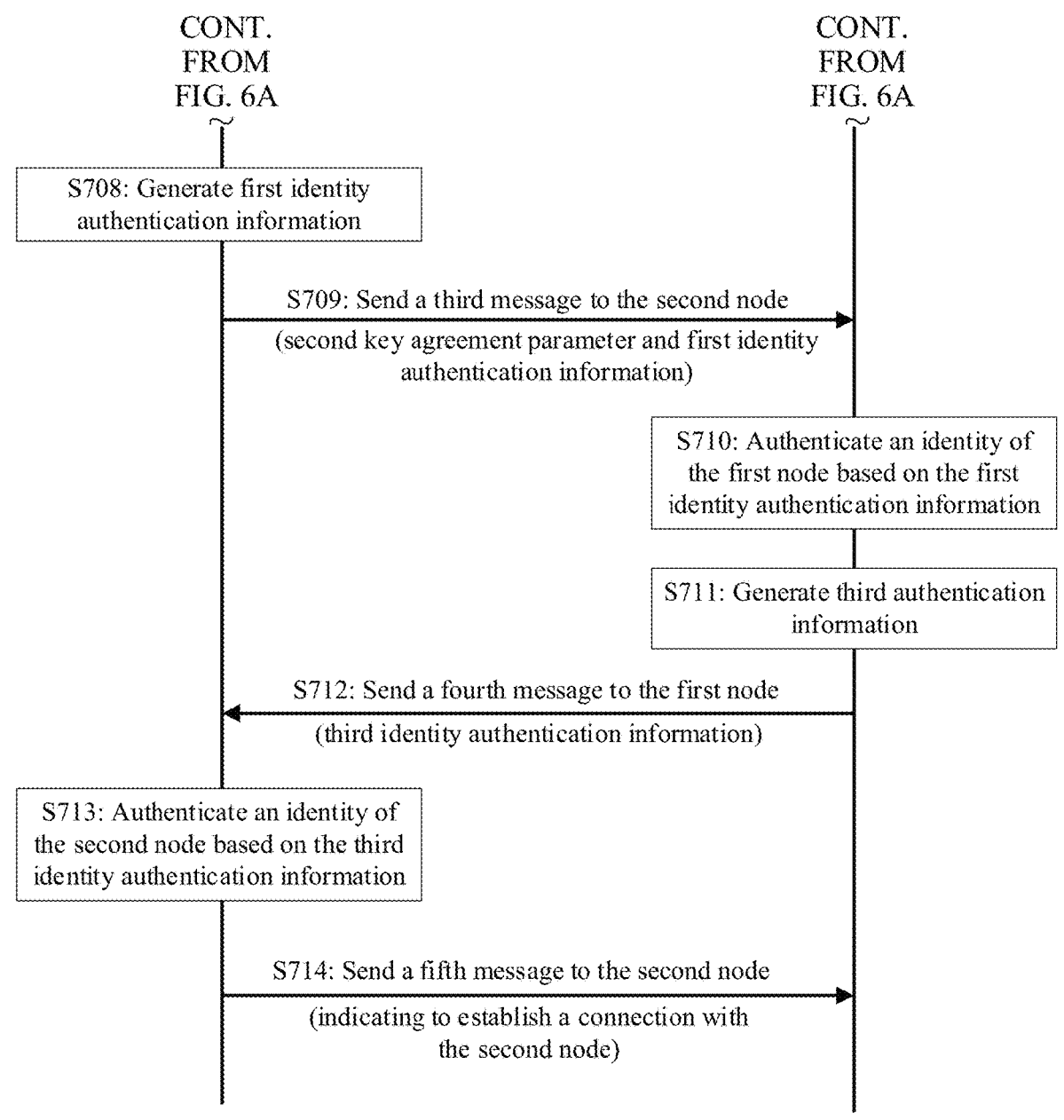

CONT.
FROM
FIG. 6A

CONT.
FROM
FIG. 6A

S708: Generate first identity authentication information

S709: Send a third message to the second node (second key agreement parameter and first identity authentication information)

S710: Authenticate an identity of the first node based on the first identity authentication information S711: Generate third authentication information S712: Send a fourth message to the first node (third identity authentication information)

S713: Authenticate an identity of the second node based on the third identity authentication information S714: Send a fifth message to the second node (indicating to establish a connection with the second node)

FIG. 6B

User interface 51

User interface 52

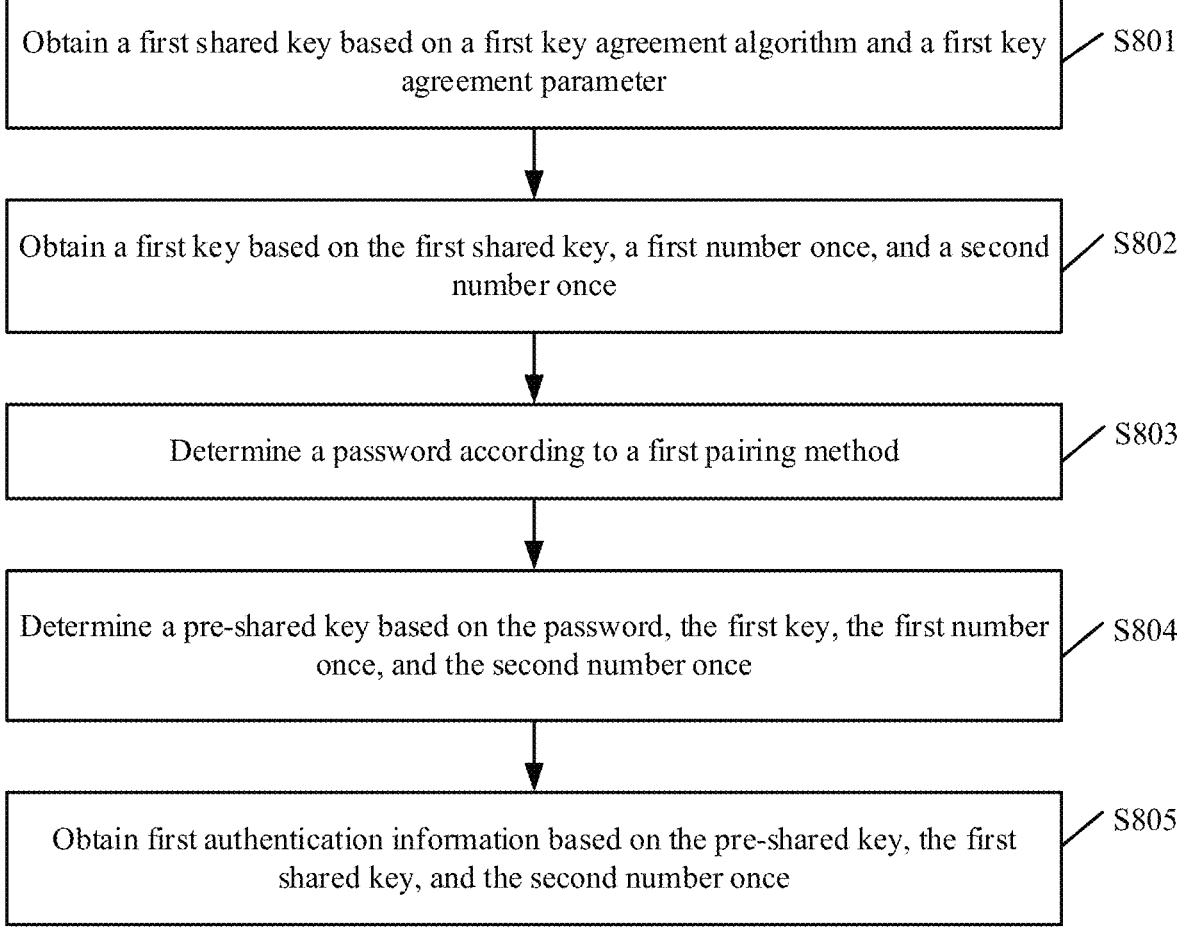

Obtain a first shared key based on a first key agreement algorithm and a first key agreement parameter   S801

Obtain a first key based on the first shared key, a first number once, and a second number once   S802

Determine a password according to a first pairing method   S803

Determine a pre-shared key based on the password, the first key, the first number once, and the second number once   S804

Obtain first authentication information based on the pre-shared key, the first shared key, and the second number once   S805

FIG. 8

| Pairing method / First node / Second node | A | B | | | |
|---|---|---|---|---|---|
| A | Method 1 and Method 6 | Method 2 and Method 6 | ⋮ | ⋮ | ⋮ |
| B | Method 3 and Method 6 | Method 6 | ⋮ | ⋮ | ⋮ |
| C | Method 1 and Method 2 | Method 2 | | ⋮ | ⋮ |
| D | Method 5 | ⋮ | | | |
| E | Method 5 | ⋮ | | | |

FIG. 9

PAIRING METHOD AND APPARATUS

CROSS-REFERENCE TO RELATED APPLICATIONS

This application is a continuation of International Application No. PCT/CN2021/083641, filed on Mar. 29, 2021, the disclosure of which is hereby incorporated by reference in its entirety.

TECHNICAL FIELD

This application relates to the field of communications technologies and the field of connected vehicles, and in particular, to the field of short-range communications technologies, for example, cockpit domain communication. Specifically, this application relates to a pairing method and apparatus.

BACKGROUND

With the rapid development of informatization, mobile terminals such as a mobile phone, a pad, and other portable intelligent terminals are indispensable and important personal intelligent tools, and bring many conveniences to people's life. Development of communication technologies enables people to use the intelligent tools to perform convenient and convenient communication. For example, a Bluetooth technology is a radio technology that can support short-range communication (generally 10 m) of devices, and can perform wireless information exchange between many devices such as a mobile phone, a wireless headset, a notebook computer, and a related peripheral. Based on the Bluetooth technology, communication between mobile communication terminal devices can be effectively simplified, and communication between a device and the internet can also be successfully simplified, so that data transmission becomes faster and more efficient.

To ensure communication security, before two nodes (referred to as a first node and a second node for ease of description) communicate, the second node accesses the first node by using a pairing method. Currently, the pairing method between the two nodes is uniquely determined by input/output capabilities (TO capabilities, where I represents input, and O represents output) of the two devices. For example, if the IO capability of the first node is a digit input capability, and the IO capability of the second node is a display capability, there is only one pairing method between the first node and the second node, and the pairing method may be that the first node enters a password and the second node displays the password.

In a current communication technology, there is only one pairing method between two nodes, application scenarios are limited, and flexibility of pairing between the nodes is not high.

SUMMARY

Embodiments of this application disclose a pairing method and apparatus. According to this application, a plurality of pairing methods may be supported between two nodes, so that flexibility of pairing between the nodes can be improved.

According to a first aspect, an embodiment of this application discloses a pairing method, applied to a first node and including:

sending a first message, where the first message includes indication information of at least one pairing method supported by the first node; and receiving a second message from a second node, where the second message includes indication information of a first pairing method, and the first pairing method is included in a pairing method supported by both the first node and the second node.

In embodiments of this application, the first node and the second node support one or more pairing methods, and the second node may determine the first pairing method from the pairing method supported by both the first node and the second node, so that the first node and the second node can perform pairing according to the first pairing method. According to this application, the first node and the second node may determine the first pairing method through agreement based on different application scenarios, so that a plurality of selections of a pairing method between the two nodes are provided, thereby improving flexibility of pairing between the nodes.

In a possible embodiment of the first aspect, the second message is for requesting to establish an association with the first node.

In another possible embodiment of the first aspect, the first message further includes priority information corresponding to the at least one pairing method supported by the first node, or a priority corresponding to the at least one pairing method is preconfigured.

In still another possible embodiment of the first aspect, the first pairing method is determined based on the priority information of the at least one pairing method supported by the first node.

In some embodiments, a priority may represent an appropriate degree of a pairing method between two nodes. Therefore, in this application, the node may determine, based on the priority, the first pairing method according to a preferred pairing method between the two nodes.

In still another possible embodiment of the first aspect, the second message further includes indication information of at least one pairing method supported by the second node.

In still another possible embodiment of the first aspect, the method further includes:

determining whether to use the first pairing method to establish an association with the second node; and when determining not to use the first pairing method to establish the association with the second node, sending a rejection message to the second node, where the rejection message indicates that a pairing method is incorrectly selected.

In this application, the first node may further perform determining on the first pairing method determined by the second node. For example, when priorities are preset for both the first node and a trusted node, if the first pairing method in the second message received by the second node is not a pairing method with a highest priority, the second message may be tampered with by an attacker, or the second message or the second node is not a trusted node, and the first node does not pair with the second node according to the first pairing method, and sends the rejection message to the second node, so as to ensure security of the first node.

In still another possible embodiment of the first aspect, the method further includes:

determine a second pairing method from the pairing method supported by both the first node and the second node; and when the first pairing method and the second pairing method are not a same pairing method, determine not to use the first pairing method to establish the association with the second node.

In still another possible embodiment of the first aspect, the rejection message includes indication information indicating the second pairing method.

In still another possible embodiment of the first aspect, the second message further includes indication information of a first key agreement algorithm and a first key agreement parameter, the first key agreement parameter is generated by the second node based on the first key agreement algorithm, and the method further includes:

sending a third message to the second node, where the third message includes first authentication information and a second key agreement parameter, the second key agreement parameter is obtained by the first node based on the first key agreement algorithm, the first authentication information is obtained by the first node based on a first shared key, and the first shared key is determined by the first node based on the first key agreement algorithm and the first key agreement parameter; and receiving a fourth message from the second node, where the fourth message is sent to the first node by the second node when the second node verifies that the first authentication information is consistent with second authentication information, the second authentication information is obtained by the second node based on a second shared key, and the second shared key is obtained by the second node based on the first key agreement algorithm and the second key agreement parameter.

In still another possible embodiment of the first aspect, the fourth message includes third authentication information, the third authentication information is obtained by the second node based on the second shared key, and the method further includes:

when verifying that the third authentication information is consistent with fourth authentication information, determining that identity authentication on the second node succeeds, where the fourth authentication information is obtained by the first node based on the first shared key.

In still another possible embodiment of the first aspect, the third authentication information is generated by the second node based on an inferring algorithm, the second shared key, and the at least one pairing method supported by the first node, and the method further includes:

generating the fourth authentication information based on the inferring algorithm, the first shared key, and the at least one pairing method supported by the first node.

In some embodiments, when generating the third authentication information, the second node may further use the priority of the at least one pairing method supported by the first node. In some embodiments, the third authentication information is generated by the second node based on the inferring algorithm, the second shared key, the at least one pairing method supported by the first node, and the priority of the at least one pairing method supported by the first node. In this case, the first node may generate the fourth authentication information based on the inferring algorithm, the first shared key, the at least one pairing method supported by the first node, and the priority of the at least one pairing method supported by the first node. Further, when verifying that the third authentication information is consistent with the fourth authentication information, the first node determines that identity authentication on the second node succeeds.

In still another possible embodiment of the first aspect, the first message further includes indication information of a key agreement algorithm supported by the first node, and the indication information of the key agreement algorithm supported by the first node is used by the second node to: determine the first key agreement algorithm from a key agreement algorithm supported by both the first node and the second node and determine the first key agreement parameter based on the first key agreement algorithm.

In still another possible embodiment of the first aspect, the second message further includes a first number once, and the method further includes:

obtaining a first key through inferring based on the first shared key, the first number once, and a second number once, where the second number once is generated by the first node;

determining a password according to the first pairing method;

determining a pre-shared key PSK between the first node and the second node based on the password, the first key, the first number once, and the second number once; and generating the first authentication information based on the PSK, the first shared key, and the first number once.

In still another possible embodiment of the first aspect, the method further includes:

obtaining a first message integrity code MIC based on the third message, where the first MIC is for verifying integrity of the third message;

sending the first MIC to the second node, so that the second node generates the first authentication message when verification on the integrity of the third message based on the first MIC succeeds; and when verification on integrity of the fourth message based on a second MIC succeeds, establishing an association with the second node according to the first pairing method, where the fourth message includes the second MIC, and the second MIC is obtained by the second node based on the fourth message.

In still another possible embodiment of the first aspect, the indication information of the at least one pairing method supported by the first node is an input/output capability of the first node.

In still another possible embodiment of the first aspect, the first pairing method is selected by a user of the second node in the pairing method supported by both the first node and the second node.

In still another possible embodiment of the first aspect, the first message may alternatively be broadcast by the first node to the second node. The second message is also referred to as an access request message (or an association request message). Further, the third message may also be referred to as a security context request message (or an identity authentication request message). The fourth message may also be referred to as a security context response message (or an identity authentication response message).

In still another possible embodiment of the first aspect, the method further includes:

sending a fifth message to the second node, where the fifth message indicates that access succeeds, or indicates that the association is complete. Further, the fifth message may be referred to as an association establishment message (or an access association complete message), an association complete message, or the like.

According to a second aspect, an embodiment of this application discloses a pairing method, applied to a second node and including:

receiving a first message from a first node, where the first message includes indication information of at least one pairing method supported by the first node;

determining a first pairing method from a pairing method supported by both the first node and the second node; and sending a second message to the second node, where the second message includes the first pairing method.

In a possible embodiment of the second aspect, the second message is for requesting to establish an association with the first node.

In another possible embodiment of the second aspect, the first message further includes priority information corresponding to the at least one pairing method supported by the first node, or a priority corresponding to the at least one pairing method is preconfigured.

In still another possible embodiment of the second aspect, the determining a first pairing method from a pairing method supported by both the first node and the second node includes:

determining, based on the priority information of the at least one pairing method supported by the first node, the first pairing method from the pairing method supported by both the first node and the second node.

In still another possible embodiment of the second aspect, the second message further includes indication information of at least one pairing method supported by the second node.

In still another possible embodiment of the second aspect, the method further includes:

receiving a rejection message from the first node, where the rejection message indicates that a pairing method is incorrectly selected, and the rejection message is sent to the second node when the first node determines not to use the first pairing method to establish an association with the second node.

In still another possible embodiment of the second aspect, the rejection message includes indication information indicating a second pairing method.

In still another possible embodiment of the second aspect, the second pairing method is determined by the first node from the pairing method supported by both the first node and the second node, and the second pairing method is used by the first node to determine, when the first pairing method and the second pairing method are not a same pairing method, not to use the first pairing method to establish the association with the second node.

In still another possible embodiment of the second aspect, the second message further includes indication information of a first key agreement algorithm and a first key agreement parameter, the first key agreement parameter is generated by the second node based on the first key agreement algorithm, and the method further includes:

receiving a third message from the first node, where the third message includes first authentication information and a second key agreement parameter, the second key agreement parameter is obtained by the first node based on the first key agreement algorithm, the first authentication information is obtained by the first node based on a first shared key, and the first shared key is determined by the first node based on the first key agreement algorithm and the first key agreement parameter; and sending a fourth message to the second node, where the fourth message is sent to the first node by the second node when the second node verifies that the first authentication information is consistent with second authentication information, the second authentication information is obtained by the second node based on a second shared key, and the second shared key is obtained by the second node based on the first key agreement algorithm and the second key agreement parameter.

In still another possible embodiment of the second aspect, the fourth message includes third authentication information, the third authentication information is obtained by the second node based on the second shared key, the third authentication information is used by the first node to determine, when the first node verifies that the third authentication information is consistent with fourth authentication information, that identity authentication on the second node succeeds, and the fourth authentication information is obtained by the first node based on the first shared key.

In still another possible embodiment of the second aspect, the method further includes:

generating the third authentication information based on an inferring algorithm, the second shared key, and the at least one pairing method supported by the first node, where the fourth authentication information is generated based on the inferring algorithm, the first shared key, and the at least one pairing method supported by the first node.

In still another possible embodiment of the second aspect, the first message further includes indication information of a key agreement algorithm supported by the first node, and the indication information of the key agreement algorithm supported by the first node is used by the second node to: determine the first key agreement algorithm from a key agreement algorithm supported by both the first node and the second node and determine the first key agreement parameter based on the first key agreement algorithm.

In still another possible embodiment of the second aspect, the second message further includes a first number once, and the method further includes:

obtaining a first key through inferring based on the second shared key, the first number once, and a second number once, where the second number once is generated by the first node;

determining a password according to the first pairing method;

determining a pre-shared key (PSK) between the first node and the second node based on the password, the first key, the first number once, and the second number once; and generating the second authentication information based on the PSK, the second shared key, and the first number once.

In still another possible embodiment of the second aspect, the method further includes:

receiving a first message integrity code (MIC) from the first node, where the first MIC is obtained by the first node based on the third message, and the first MIC is for verifying integrity of the third message;

generating the first authentication message when verification on the integrity of the third message based on the first MIC succeeds; and obtaining a second MIC based on the fourth message, where the fourth message includes the second MIC, so that when verification on integrity of the fourth message based on the second MIC succeeds, the first node establishes the association with the second node according to the first pairing method.

In still another possible embodiment of the second aspect, the indication information of the at least one pairing method supported by the first node is an input/output capability of the first node.

In still another possible embodiment of the second aspect, the first pairing method is selected by a user of the second node in the pairing method supported by both the first node and the second node.

With reference to any possible embodiment of the first aspect and the second aspect, in the foregoing embodiment, the first node may further determine the first pairing method.

In a possible embodiment, the first node sends the first message to the second node. The second node sends, to the first node in response to the first message, the indication information of the pairing method supported by the second node. The first node determines the first pairing method from the pairing method supported by both the first node and the second node. The first node sends, to the second node, indication information indicating the first pairing method.

In another possible embodiment, the first node sends the first message to the second node, where the first message includes the indication information of the key agreement algorithm supported by the first node. After receiving the first message, the second node sends an association request message to the first node, where the association request message includes an identity identifier of the second node, the first key agreement algorithm determined by the second node from the key agreement algorithm supported by both the first node and the second node, the first key agreement parameter generated by the second node based on the first key agreement algorithm, a number once generated by the second node, and indication information of a pairing capability of the second node, and in some embodiments, may further include priority information of the pairing method. In response to the association request message, the first node determines the first pairing method from the pairing method supported by both the first node and the second node, and further sends indication information of the first pairing method to the second node based on a security context request message.

It should be noted that, for content of the embodiment in which the first node determines the first pairing method, refer to related content in any possible embodiment of the first aspect and the second aspect. Details are not described herein again.

According to a third aspect, an embodiment of this application discloses a pairing apparatus, where the pairing apparatus includes a receiving unit, a sending unit, and a processing unit. The pairing apparatus is configured to implement the pairing method described in any one of the first aspect or the possible embodiments of the first aspect.

According to a fourth aspect, an embodiment of this application discloses a pairing apparatus, including a sending unit, a receiving unit, and a processing unit. The pairing apparatus is configured to implement the pairing method described in any one of the second aspect or the possible embodiments of the second aspect.

According to a fifth aspect, an embodiment of this application discloses a pairing apparatus, including a processor and a communication interface. The processor is configured to invoke a computer program stored in a memory, to implement the method described in any one of the first aspect or the possible embodiments of the first aspect.

According to a sixth aspect, an embodiment of this application discloses a pairing apparatus, including a processor and a communication interface. The processor is configured to invoke a computer program stored in a memory, to implement any one of the first aspect or the possible embodiments of the first aspect.

According to a seventh aspect, an embodiment of this application further provides a chip system. The chip system includes at least one processor and a communication interface, the communication interface is configured to send and/or receive data, and the at least one processor is configured to invoke a computer program stored in at least one memory, so that an apparatus in which the chip system is located is enabled to implement the method described in any one of the first aspect or the possible embodiments of the first aspect, or implement the method described in any one of the second aspect or the possible embodiments of the second aspect.

According to an eighth aspect, an embodiment of this application further provides a communication system, including a first node and a second node. The first node includes the pairing apparatus described in any one of the third aspect or the possible embodiments of the third aspect, or includes the pairing apparatus described in any one of the fifth aspect or the possible embodiments of the fifth aspect. The second node includes the pairing apparatus described in any one of the fourth aspect or the possible embodiments of the fourth aspect, or includes the pairing apparatus described in any one of the sixth aspect or the possible embodiments of the sixth aspect.

According to a ninth aspect, an embodiment of this application discloses a computer-readable storage medium. The computer-readable storage medium stores a computer program. When the computer program is run on one or more processors, the method described in any one of the first aspect or the possible embodiments of the first aspect is performed, or the method described in any one of the second aspect or the possible embodiments of the second aspect is performed.

According to a tenth aspect, an embodiment of this application discloses a computer program product. When the computer program product runs on one or more processors, the method described in any one of the first aspect or the possible embodiments of the first aspect is performed, or the method described in any one of the second aspect or the possible embodiments of the second aspect is performed.

According to an eleventh aspect, an embodiment of this application discloses a terminal. The terminal may be an intelligent cockpit product, a vehicle, or the like, and the terminal includes a first node and/or a second node. The second node (for example, one or more of modules such as a camera, a screen, a microphone, a speaker, a radar, an electronic key, a keyless entrance and startup system controller, and a user equipment (UE) includes the apparatus described in any one of the third aspect or the possible embodiments of the third aspect. The first node (such as a base station or a car cabin domain controller (CDC) includes the pairing apparatus described in any one of the fourth aspect or the possible embodiments of the fourth aspect.

Alternatively, the terminal may be replaced with an intelligent terminal or a transportation tool such as a drone or a robot.

BRIEF DESCRIPTION OF DRAWINGS

The following describes accompanying drawings used in embodiments of this application.

FIG. 1 is a principle diagram of a DH algorithm according to an embodiment of this application;

9 10

Figure 3:
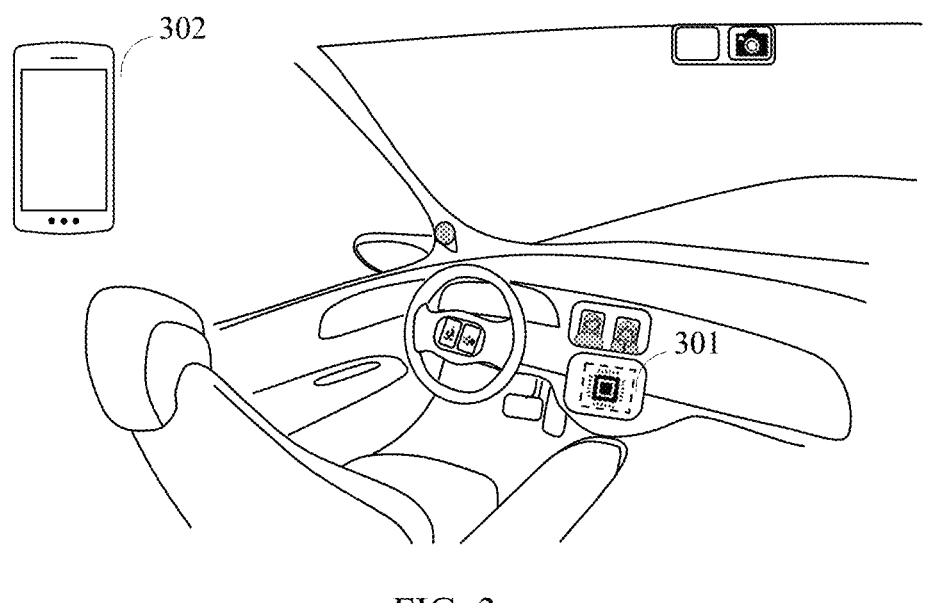
Figure 4:
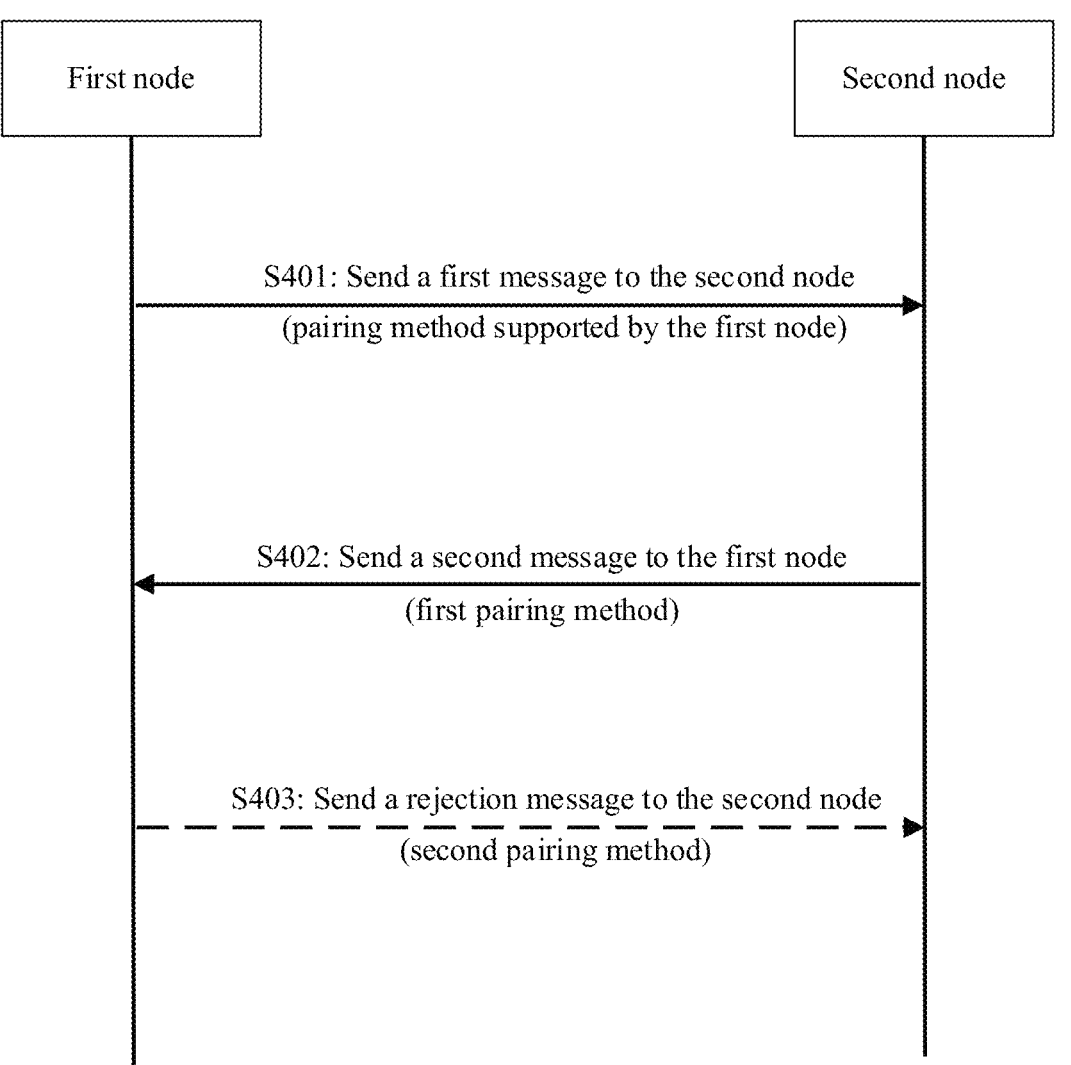
Figure 5:
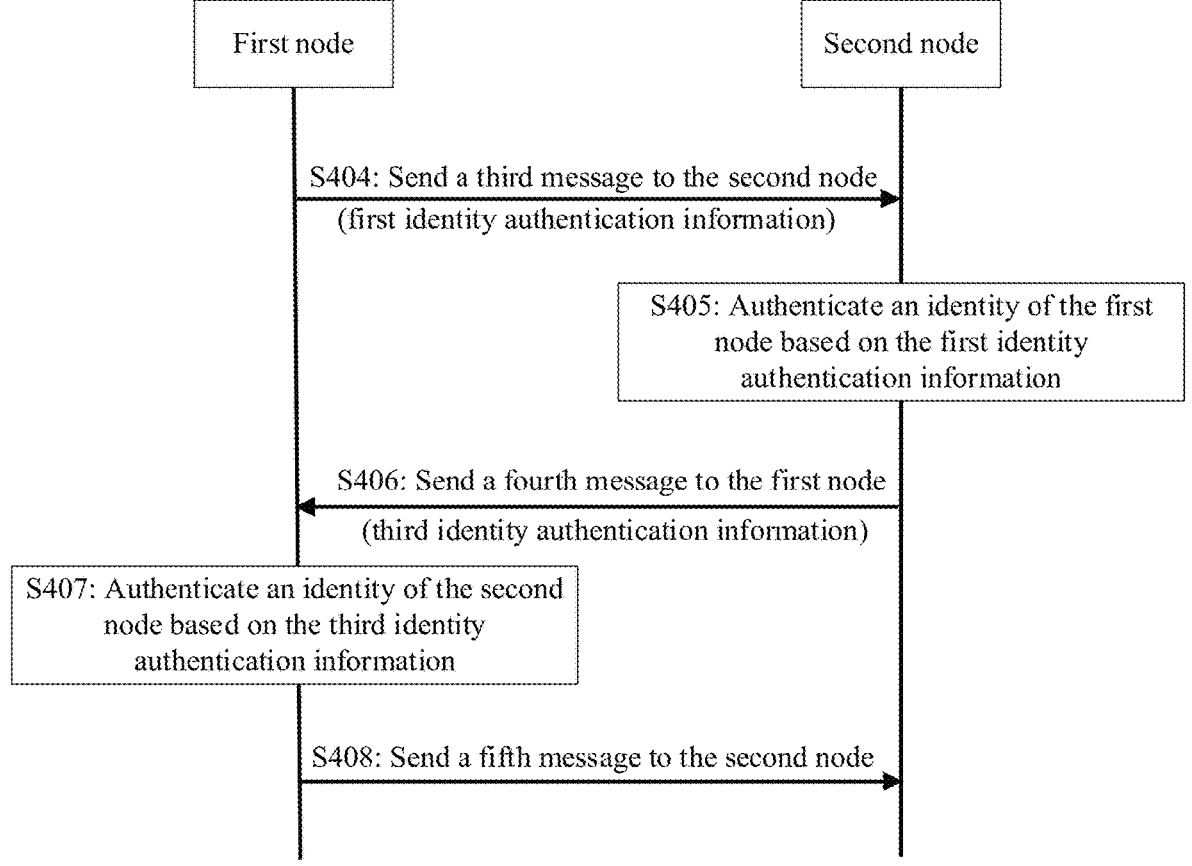
Figure 6A:
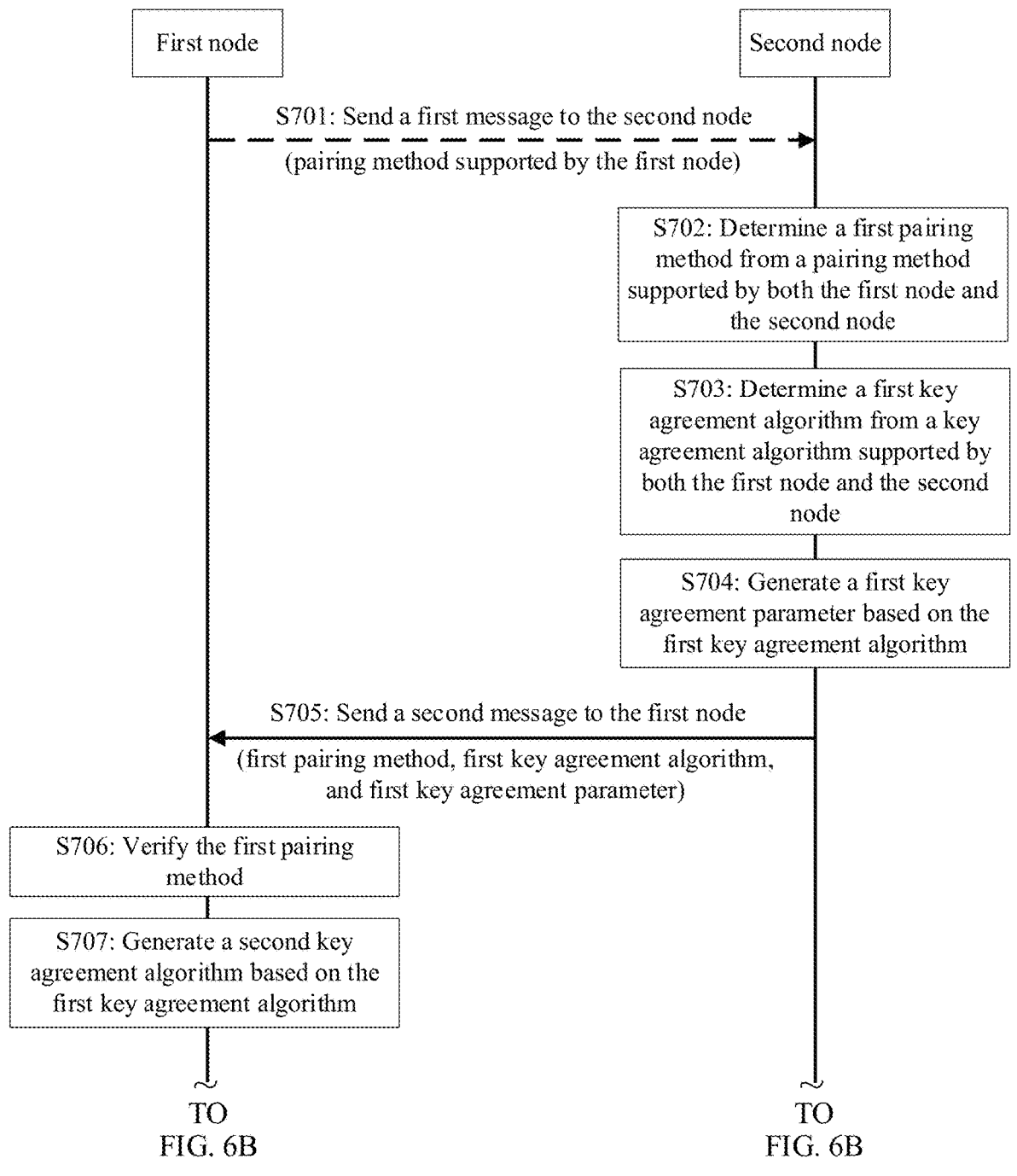
Figure 7A:
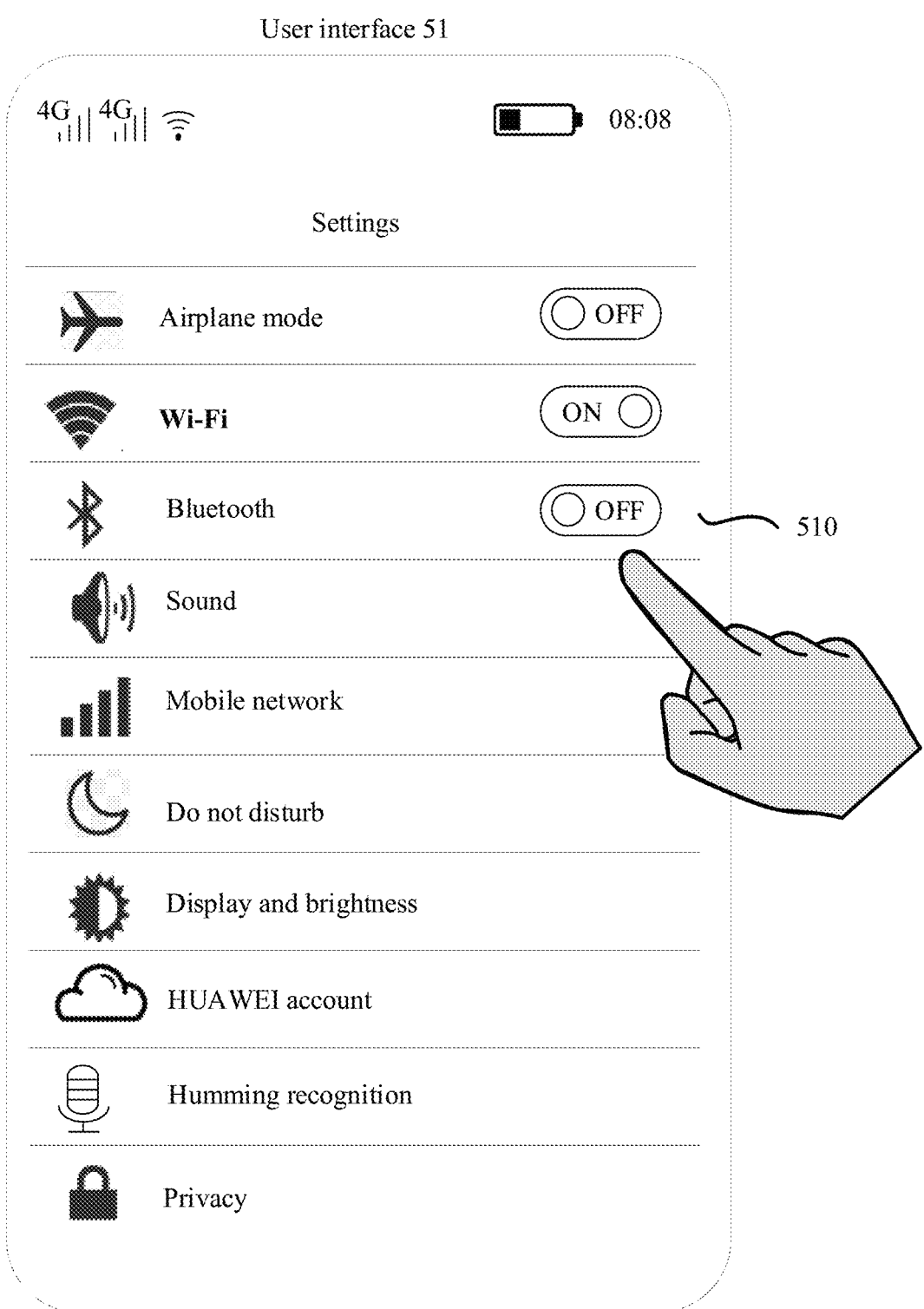
Figure 7B:
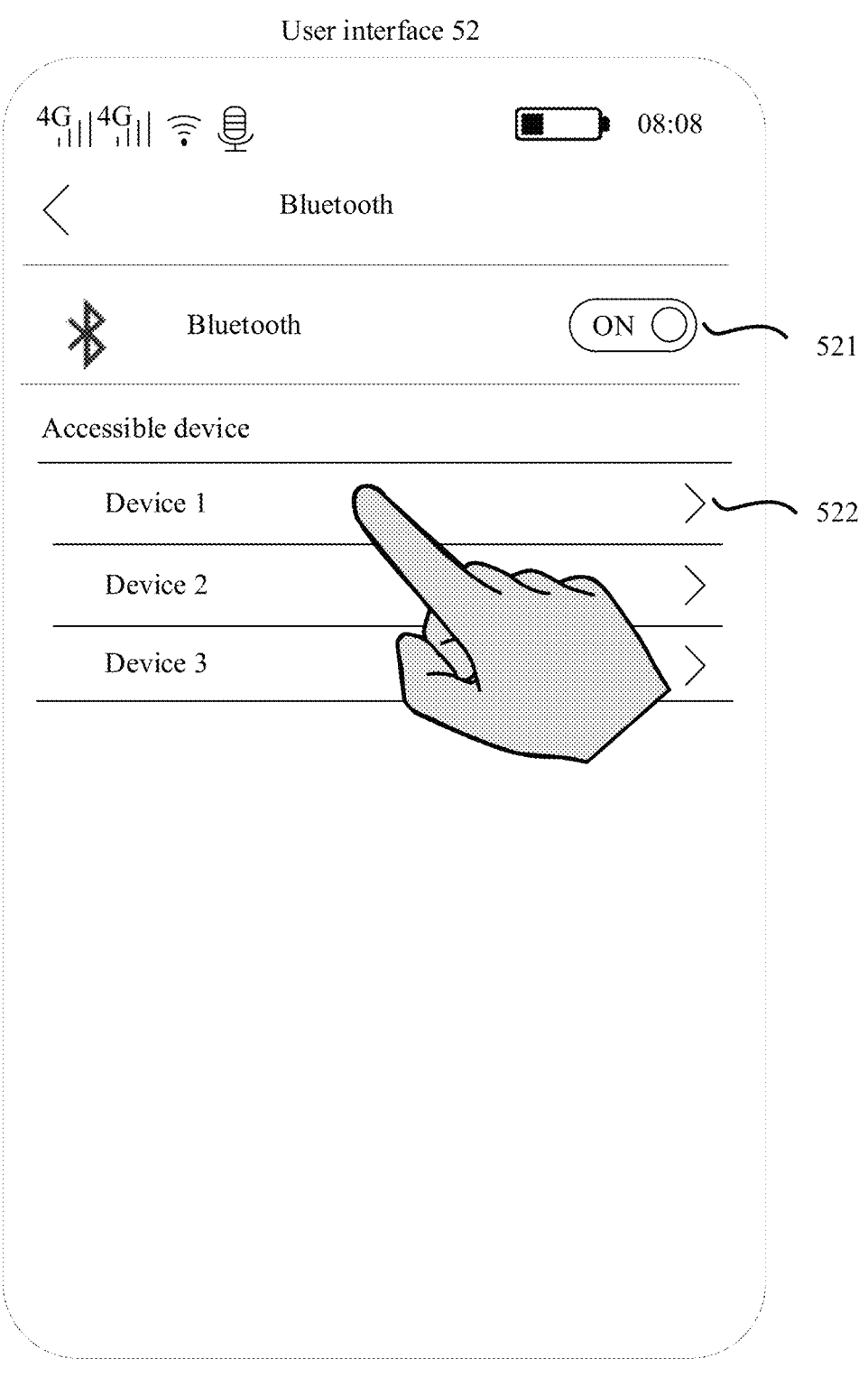
Figure 7C:
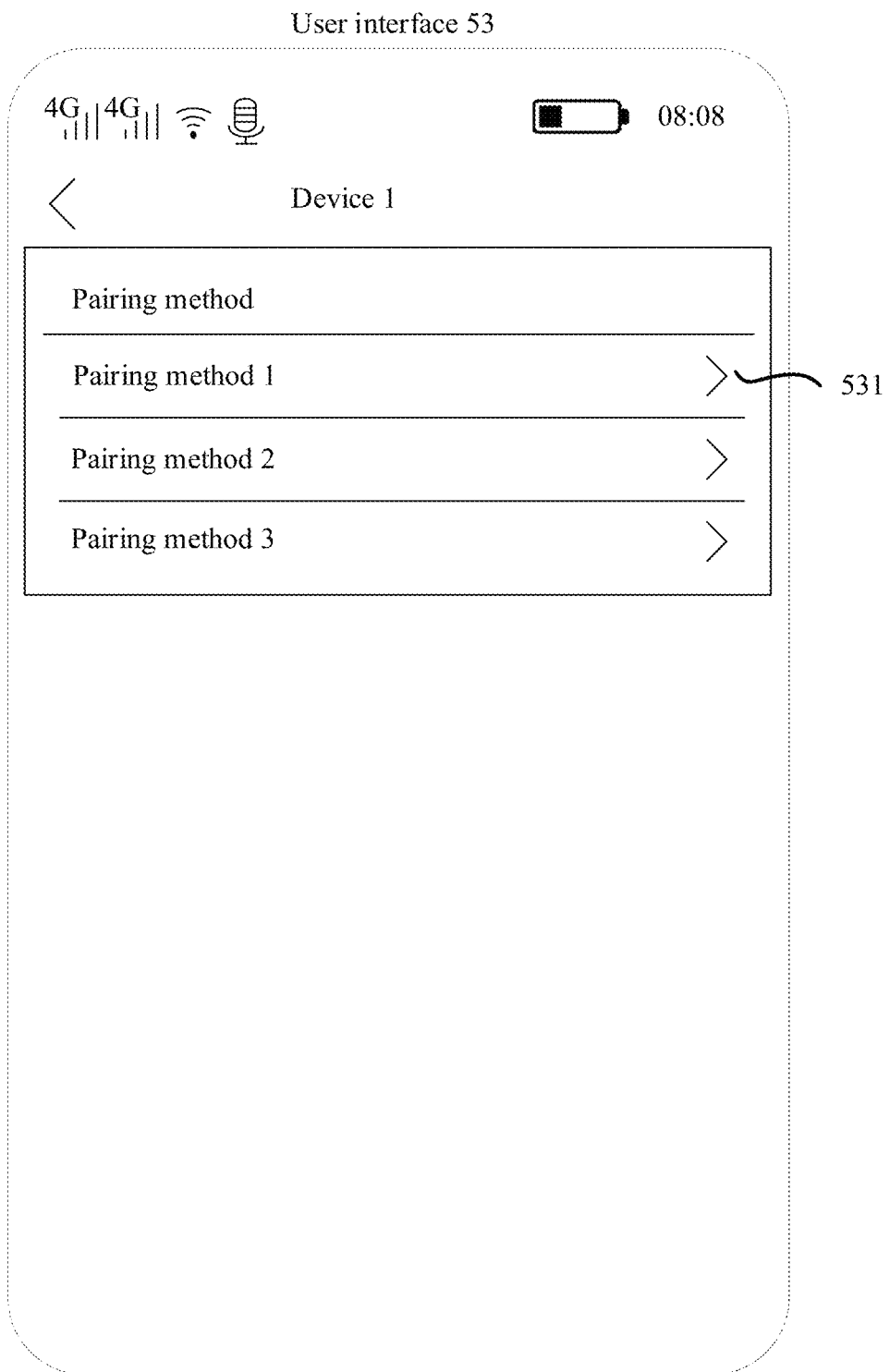
Figure 10:
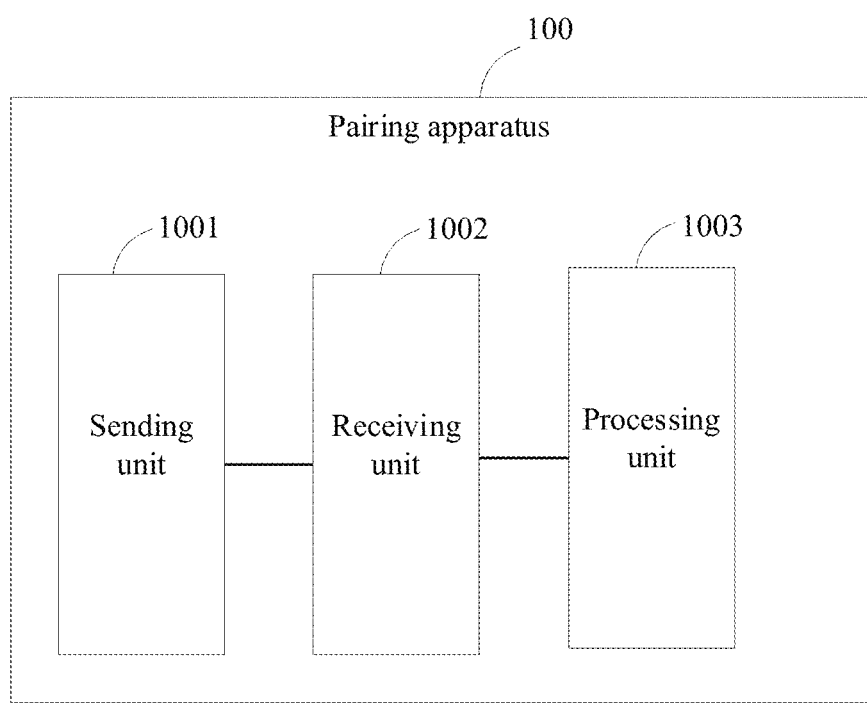
Figure 11:
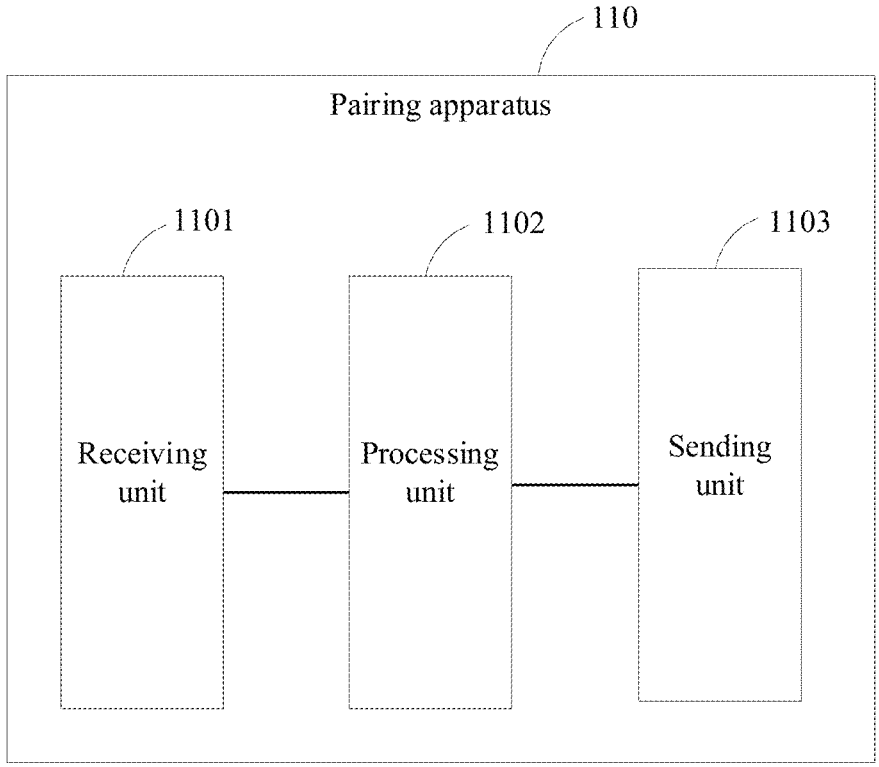
Figure 12:
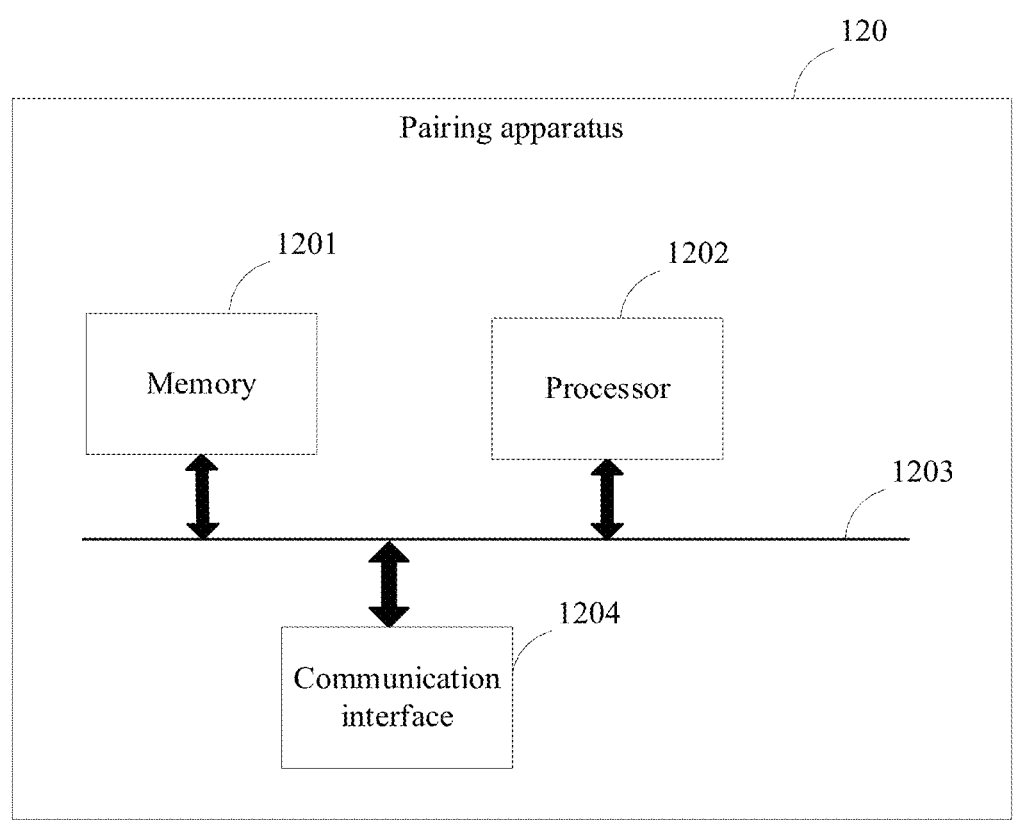

FIG. 2 is a diagram of a possible communication system according to an embodiment of this application;

FIG. 3 is a diagram of a possible communication scenario according to an embodiment of this application;

FIG. 4 is a flowchart of a pairing method according to an embodiment of this application;

FIG. 5 is a partial flowchart of a pairing method according to an embodiment of this application;

FIG. 6A and FIG. 6B are a flowchart of another pairing method according to an embodiment of this application;

FIG. 7(A), FIG. 7(B), and FIG. 7(C) are a diagram of a human-machine interaction interface according to an embodiment of this application;

FIG. 8 is a flowchart of generating first authentication information according to an embodiment of this application;

FIG. 9 is a diagram of a pairing method according to an embodiment of this application;

FIG. 10 is a diagram of a structure of a pairing apparatus according to an embodiment of this application;

FIG. 11 is a diagram of a structure of another pairing apparatus according to an embodiment of this application; and FIG. 12 is a diagram of a structure of still another pairing apparatus according to an embodiment of this application.

DESCRIPTION OF EMBODIMENTS

Embodiments of this application are described below with reference to the accompanying drawings in embodiments of this application. It should be noted that, in this application, terms such as "example" or "for example" are used to represent an example, an instance, or an illustration. Any embodiment or design scheme described as "example" or "for example" in this application should not be construed as being more preferred or advantageous than other embodiments or design schemes. Exactly, use of the term such as "example" or "for example" is intended to present a relative concept in a particular manner.

In embodiments of this application, "at least one" refers to one or more, and "a plurality of" refers to two or more. "At least one of the following items (pieces)" or a similar expression thereof refers to any combination of these items, including any combination of singular or plural items (pieces). For example, at least one item (piece) of a, b, or c may represent a, b, c, (a and b), (a and c), (b and c), or (a, b, and c), where a, b, and c may be singular or plural. "And/or" describes an association relationship between associated objects and represents that three relationships may exist. For example, A and/or B may represent the following three cases: Only A exists, both A and B exist, and only B exists, where A and B may be singular or plural. The character "I" generally indicates an "or" relationship between the associated objects.

In addition, unless otherwise specified, ordinal numbers such as "first" and "second" used in embodiments of this application are used to distinguish between a plurality of objects, and are not intended to limit an order, a time sequence, priorities, or importance of the plurality of objects. For example, first information and second information are merely used to distinguish between different information, but do not indicate that the two types of information are different in content, priorities, sending sequences, importance, or the like.

The following first describes technical terms used in embodiments of this application.

1. Node (Node)

A node is an electronic device that has data processing, sending, and receiving capabilities, or a component (for example, a chip or an integrated circuit) in the electronic device. The electronic device may include a terminal device or a network side device. For example, the node may be a cockpit domain device, or a module (for example, one or more of modules such as a cockpit domain controller (CDC), a camera, a screen, a microphone, a speaker, an electronic key, and a keyless entrance or startup system controller) in the cockpit domain device. In some embodiments, the node may alternatively be a data transit device, for example, a base station, a router, a relay, a bridge, or a switch; or may be a terminal device, for example, various types of user equipments (UEs), a mobile phone, a tablet computer (pad), a desktop computer, a headset, and a stereo; or may further include a machine intelligent device, for example, a self-driving device, a transportation safety device, a smart home device (for example, one or more of an audio and video device, a security device, a smart lighting device, or an environment monitoring device), a virtual reality (VR) terminal device, an augmented reality (AR) terminal device, a machine type communication (MTC) device, an industrial control device, a telemedicine device, a smart grid device, or a smart city device; or may further include a wearable device (such as a smart watch, a smart band, or a pedometer).

In some technical scenarios, a device with the similar data receiving and sending capabilities may not be referred to as a node. However, for ease of description, electronic devices with the data receiving and sending capabilities are collectively referred to as a node in embodiments of this application.

2. Key Agreement Algorithm

Key agreement is a process in which two communication parties exchange some parameters to obtain a key through agreement. An algorithm used for key agreement is referred to as a key agreement algorithm or a key exchange algorithm.

Common key agreement algorithms include a Diffie-Hellman key exchange (DH) algorithm, an elliptic curve cryptosystems (ECC)-based DH (ECDH) algorithm, Chinese cryptographic algorithms (such as SM1, SM2, SM3, and SM4), and an Oakley algorithm.

It should be noted that the key agreement algorithm may also be considered as a key agreement protocol, in other words, for both communication parties, the key agreement algorithm defines rules for key generation and exchange. How to use a key for encryption depends on other algorithms.

The DH algorithm may enable both parties to create a key on an insecure channel. The key can be used as a key to encrypt communication content in subsequent communication.

FIG. 1 is a schematic diagram of a principle of a DH algorithm according to an embodiment of this application. A first node and a second node obtain a determined prime number p and a number once g. Operations of exchanging keys between the two nodes based on the DH algorithm are as follows.

Operation 1: The second node determines a number once a.

Operation 2: The second node generates a first calculated value A, where $A=g^a \bmod p$.

Operation 3: The second node sends the first calculated value A to the first node.

Operation 4: The first node determines a number once b.

Operation 5: The first node obtains a second calculated value B through calculation, where $B=g^b \bmod p$.

Operation 6: The first node determines a key s, where s=$A_b$ mod p.

Operation 7: The first node sends the second calculated value B to the second node.

Operation 8: The second node determines a key s, where s=$B^a$ mod p.

Because s=$A^b$ mod p=($g^a$ mod p)$^b$ mod p=$g^{ab}$ mod p=($g^b$ mod p)$^a$ mod p=$B^a$ mod p, the keys s obtained by the first node and the second node are the same. The key s is not directly transmitted in a message. Therefore, an attacker cannot directly obtain the key. The agreed key s can be obtained through calculation only after an attacker obtains a or b through brute force cracking. In this case, the attacker performs brute force cracking based on A, g, and p to obtain a through calculation: a=$\log_g{}^A$ mod p. Because there is no fast calculation algorithm in a logarithmic operation, and values of the prime number p and the number once g are usually relatively large, it is difficult for the attacker to obtain a through the logarithmic operation and a modulo operation based on A, the prime number p, and the number once g. Therefore, a key K obtained based on the DH algorithm is secure.

In this embodiment of this application, the two nodes may perform key agreement based on the key agreement algorithm to obtain a key agreement parameter. The key agreement algorithm may be the foregoing common key agreement algorithm such as the DH algorithm, or may be another algorithm, and this is not limited herein.

3. ECDH Key Exchange

An elliptic curve algorithm requires a cyclic subgroup of an elliptic curve defined in a finite field. Required parameters are as follows: a prime number p used to describe a size of the finite field, parameters a and b of an elliptic curve equation, a base point G used to generate a cyclic subgroup, an order n of the subgroup, and a cofactor h (h=N/n, where N is an order of an elliptic curve group) of the subgroup. Generally, six parameters (p, a, b, G, n, h) are used together to define the elliptic curve used in the elliptic curve algorithm.

An ECDH algorithm is mainly implemented based on the following equation: K=k×G, where K and G are points on an elliptic curve Ep(a,b), n is an order of G (where nG=O∞, and O∞ refers to an infinity point), and k is an integer less than n. In K=kG, for given k and G, it is easy to calculate K according to an addition rule (for example, by using a point addition operation). However, in another case, for given K and G, it is very difficult to obtain k. In practice, in the elliptic curve algorithm, p is excessively large and n is also excessively large in principle. Therefore, it is a mathematical problem to calculate n points and compare the n points with K one by one.

In a key exchange process, assuming that two parties in key exchange are Alice and Bob, and the two parties have shared curve parameters (an ellipsoid curve E, an order N, and a base point G). Exchange operations may be as follows.

Operation 1: Alice generates a random integer a, and calculates a first calculated value A=a×G.

Operation 2: Bob generates a random integer b, and calculates a second calculated value B=b×G.

Operation 3: Alice transfers A to Bob. The transfer of A can be disclosed. In some embodiments, an attacker can obtain A and G, but it is difficult to calculate a based on A and G.

Operation 4: Bob transfers B to Alice. Similarly, the transfer of B can be disclosed. For example, the attacker can obtain B and G, but it is difficult to calculate a based on B and G.

Operation 5: Bob receives A transferred from Alice and calculates Q=b×A=ab×G.

Operation 6: Alice receives B transferred by Bob and calculates Q'=a×B=ab×G.

Alice and Bob obtain Q=b×A=b×(a×G)=(b×a)×G=(a×b)×G=a×(b×G)=a×B=Q' (commutative law and associative law), that is, both Alice and Bob obtain the consistent key Q. Because the key Q is not directly transmitted, it is difficult for the attacker to calculate Q based on the obtained A, B, and G. Therefore, the key Q obtained through exchange based on the ECDH algorithm is secure.

In this embodiment of this application, key agreement may be performed between nodes based on the ECDH algorithm to obtain a key agreement parameter, and the nodes may further determine an exchange key based on the ECDH algorithm. The key agreement parameter and the exchange key may be used by the nodes to generate identity authentication information, where the identity authentication information is used to ensure communication security between the nodes.

4. Key Derivation Algorithm

A key derivation algorithm is for inferring (deriving or obtaining) one or more secret values from a secret value, and is also referred to as a key obtaining algorithm. For example, a new secret value DK derived from a secret value Key may be represented as follows: DK=KDF(Key). Common key derivation algorithms include a password-based key derivation function (PBKDF), a scrypt (scrypt) algorithm, and the like. The PBKDF algorithm further includes first-generation PBKDF 1 and second-generation PBKDF 2. In a key derivation process of some KDF algorithms, a hash algorithm is used to perform a hash change on an input secret value. Therefore, an algorithm identifier may be further received as an input in a KDF function, to indicate a hash algorithm to be used.

It should be noted that the KDF is not only applied to a process of obtaining a secret value through derivation, but also may be applied to aspects such as generation of authentication information and identity information.

Certainly, when the authentication information and the identity information are generated, an authentication algorithm (authentication function, AUF, or AUTH function) may also be used. The authentication algorithm is for obtaining the authentication information based on an input parameter.

In embodiments of this application, a node may calculate a key, identity authentication information, and the like based on the key derivation algorithm.

5. Fresh Parameter

A fresh parameter is a parameter in the fields of information security, and is for generating a key, an authentication parameter, and the like, and may also be referred to as a fresh degree parameter or a freshness parameter. The fresh parameter may include at least one of a number once (NONCE), a counter, a serial number, a sequence number, and the like. Fresh parameters generated at different moments are usually different. It may be understood that, because a particular value of the fresh parameter changes every time the fresh parameter is generated, and a fresh parameter used for generating a key (or an authentication parameter or the like) this time is different from a fresh parameter used for generating a key (or an authentication parameter or the like) last time, security of the generated keys can be improved.

The NONCE is a number once value that is used only once (or non-repeated).

6. Password

A password may be understood as a password preconfigured or predefined by a node for access of another node, or understood as a secret value agreed on between two nodes. In some embodiments, the password may be in a form of a character string including one or more of a number, a letter, a symbol, and the like, and may be input in a manner of a keyboard, voice, biological information, or the like. For example, in a scenario in which a mobile phone terminal accesses a router that supports a wireless fidelity (Wi-Fi) protocol, the mobile phone terminal may access the router by using a "Wi-Fi password", and the "Wi-Fi password" may be understood as a password of the router.

In some embodiments, the password may be used in the following scenarios (in an example in which a second node requests to access a first node).

Scenario 1: The first node predefines or pre-configures a first password, and a user of the second node may enter the first password in the second node. In some embodiments, the second node receives the first password entered by the user, and may request to access the first node based on the first password. For example, a vehicle owner configures the first password for a vehicle through an administrator interface. When a new smartphone of the vehicle owner needs to access the vehicle, the vehicle owner may enter the first password on the new smartphone, and the smartphone may request to access the vehicle based on the entered password.

Scenario 2: The first node predefines or pre-configures a first password. Similarly, the first password for accessing the first node is also preconfigured in the second node. When the second node needs to access the first node, the second node may perform access by using the preconfigured first password. For example, when assembling a vehicle, a host factory may configure the first password in a CDC of the vehicle, and configure the first password of the CDC in a radar of the vehicle. In this way, when accessing the CDC of the vehicle, the radar may use the first password of the CDC to access the CDC.

Scenario 3: A third-party device (such as a network-side device, a certificate center, or an authentication server, trusted by the first node) may allocate an agreed value to the first node and the second node, where the agreed value may be used by the second node to access the first node. Therefore, the agreed value may be considered as an access password of the first node.

In this embodiment of this application, a pairing method between two nodes corresponds to a usage rule for a password between the two nodes. For example, a pairing method in solution 1 may be: If a same password is input to the first node and the second node, the first node and the second node establish an association.

It may be understood that the foregoing explanation about the algorithm is merely for briefly describing an implementation principle, and whether a same parameter needs to be used for implementation during usage is not limited. In some embodiments of the algorithm, there may be other improvements and variations. The algorithm mentioned in this application may be an algorithm obtained through improvements and variations. For example, an ECC may be combined into a DSA algorithm, which is referred to as an ECDSA algorithm.

In addition, it should be noted that "authenticate", "check", and "verify" mentioned in embodiments of this application may represent a meaning of checking for correctness and appropriateness. "Access" mentioned in embodiments of this application indicates a process in which the first node establishes a connection to the second node. In some scenarios, "access" may also be described as "associate".

The following describes a system architecture and a service scenario in embodiments of this application. It should be noted that the system architecture and the service scenario described in this application are intended to describe the technical solutions in this application more clearly, and do not constitute a limitation on the technical solutions provided in this application. A person of ordinary skill in the art may know that with evolution of the system architecture and emergence of new service scenarios, the technical solutions provided in this application are also applicable to similar technical problems.

FIG. 2 is a schematic diagram of a possible communication system according to an embodiment of this application. The communication system includes a first node 201 and a second node 202.

The second node 202 may request to be associated with the first node 201. After the association succeeds, the first node 201 may communicate with the second node 202. A link for communication between the first node 201 and the second node 202 may include various types of connection media, including a wired link (for example, an optical fiber), a wireless link, a combination of a wired link and a wireless link, and the like. For example, the link may be a short-distance connection technology including 802.11b/g, Bluetooth, Zigbee, a radio frequency identification (RFID) technology, an ultra wideband (UWB) technology, a wireless short-distance communication system (for example, a vehicle-mounted wireless short-distance communication system), and the like. For another example, the link may alternatively be a long-distance connection technology including radio access type technologies such as a long term evolution (LTE)-based communication technology, a fifth generation mobile communication technology (5th generation mobile network or 5th generation wireless system, 5th-Generation, 5G or 5G technology for short), a global system for mobile communications (GSM), a general packet radio service (GPRS), and a universal mobile telecommunications system (UMTS).

Certainly, other wireless communication technologies may also be used to support communication between the first node and the second node. For example, in some embodiments, the first node may also be referred to as a G node, a control node, or an access point, and the second node may also be referred to as a T node or a terminal. A communication link from the G node to the T node may be referred to as a G link, and a communication link from the T node to the G node may be referred to as a T link.

The first node 201 and the second node 202 may be devices of a same type, or may be devices of different types. For example, FIG. 3 is a schematic diagram of a possible communication scenario according to an embodiment of this application. A cockpit domain controller (CDC) 301 of a vehicle is a control center in a smart cockpit device of the vehicle, and may be considered as the first node 201. A smartphone 302 is a device with data receiving and sending capabilities, and may be considered as the second node 202.

The CDC 301 may be accessed through Bluetooth, and the smartphone 302 supports a Bluetooth function. Therefore, the smartphone 302 may request to access the CDC 301. Because a Bluetooth technology usually uses a digital pairing mode or a just work mode for connection, in the digital pairing mode, an identifier of the CDC 301 is directly tapped on the smartphone 302, and a preset access password of the CDC 301 is entered, so that the CDC 301 can be connected through Bluetooth. The method needs to obtain the password for accessing the CDC 301, and is not applicable to a communication scenario of nodes that need to frequently change a password. Herein, only a Bluetooth access scenario is used as an example. An access scenario may further include access performed by using another communication technology. It can be learned that there is only one method for pairing two nodes. Therefore, pairing flexibility is low and application scenarios are limited.

Therefore, to improve node pairing flexibility, an embodiment of this application provides the pairing method shown in FIG. 4.

FIG. 4 is a schematic flowchart of a pairing method according to an embodiment of this application. Further, the method may be implemented based on the architecture shown in FIG. 2. The method may include some or all of the following operations.

Operation S401: A first node sends a first message to a second node, where the first message includes indication information of at least one pairing method supported by the first node.

In some embodiments, the first node may send the first message to the second node in a broadcast manner. Correspondingly, the second node may receive the first message broadcast by the first node. The first message carries an index of the pairing method supported by the first node, and the index indicates the at least one pairing method supported by the first node. It should be noted that all pairing methods are known to the first node and the second node.

In some embodiments, the first message may further include priority information corresponding to the at least one pairing method supported by the first node, or a priority corresponding to the at least one pairing method is preconfigured by the first node and the second node. For example, the first message includes N pairing methods supported by the first node, and N is a positive integer. The first message may further include priority information corresponding to the N pairing methods, and a priority of each pairing method is different. For another example, a priority, of a pairing method, preconfigured by the second node includes the priority of the pairing method supported by the first node. It should be understood that the priority, corresponding to the first node, preconfigured in the second node is the same as the priority of the pairing method supported by the first node, and the pairing method preconfigured by the first node and the second node is known to the first node and the second node.

In some embodiments, the first message may further include indication information of a key agreement algorithm supported by the first node (or referred to as a key agreement algorithm capability of the first node), indication information of a priority of the key agreement algorithm, and the like. This is not limited herein. It should be noted that, in some scenarios, the at least one pairing method supported by the first node may also be referred to as a pairing capability of the first node.

In some other embodiments, before operation S401, if the second node does not receive a broadcast message of the first node, the second node may generate a first request message, to enable the first node to perform the foregoing operation S401. The first request message is for requesting the indication information of the at least one pairing method supported by the first node. For example, the second node may generate the first request message that carries an empty pairing method, where the empty pairing method is for the at least one pairing method supported by the first node, and then further sends the first request message to the first node.

Correspondingly, in response to the first request message, when determining that the pairing method in the first request message is empty, the first node sends, to the second node, a message including the pairing capability of the first node. In some embodiments, the message may further include the priority information of the pairing method.

Operation S402: The second node sends a second message to the first node, where the second message includes indication information of a first pairing method.

In some embodiments, the second message may also be referred to as an association request message, and the second message is for requesting to establish an association with the first node. Correspondingly, the first node receives the second message from the second node.

Operation S403: The first node sends a rejection message to the second node.

In an embodiment, in response to the second message, the first node performs pairing with the first node according to the first pairing method, to establish the association.

In another embodiment, the first node first verifies the first pairing method indicated in the second message, determines whether to use the first pairing method to establish the association with the second node, and when determining not to use the first pairing method to establish the association with the second node, sends the rejection message to the second node, where the rejection message indicates that a pairing method is incorrectly selected.

For example, the second message further includes indication information of a pairing method supported by the second node. In this case, the first node may determine a second pairing method from a pairing method supported by both the first node and the second node.

When the first pairing method and the second pairing method are a same pairing method, the first node determines that the first pairing method is correct, and the first pairing method is used for establishing the association with the second node. When the first pairing method and the second pairing method are not a same pairing method, the first node determines that the first pairing method is incorrect, and then sends the rejection message to the second node. The rejection message includes the second pairing method. Further, the second node may send an association request message to the first node again to request to establish the association with the first node.

The second node may determine the second pairing method based on a priority. For example, the first message sent by the first node to the second node includes the priority information, and after receiving the first pairing method determined by the second node, the first node may determine the second pairing method based on the priority information. It may be understood that, if the first pairing method is different from the second pairing method, it is proved that the first pairing method determined by the second node is incorrect, and the second node may be an untrusted node. In this case, the first node may send the rejection message to the second node, so as to avoid access to the untrusted node.

In some embodiments, after operation S402, the pairing method in embodiments of this application may further include one or more of operation S404 to operation S408 shown in FIG. 5. Operation S404 to operation S408 are as follows.

Operation S404: The first node sends a third message to the second node, where the third message includes first authentication information.

The first authentication information is for authenticating an identity of the first node.

It should be noted that the third message may also be referred to as a security context request message.

Operation S405: The second node authenticates the identity of the first node based on the first authentication information AUTHg.

In some embodiments, when the first node sends the first authentication information to the second node, the second node may authenticate the identity of the first node based on the first authentication information.

In some embodiments, based on a protocol specification, if the first node uses a parameter to generate the first identity authentication information, the second node needs to also use the same parameter to generate check information. If the check information is the same as the first authentication information, it is considered that verification succeeds.

For example, because the first authentication information is determined based on a first shared key and/or a pre-shared key (PSK), the second node may authenticate the identity of the first node based on the first shared key and/or the PSK and the first authentication information. In some embodiments, the second node may generate second authentication information based on the first shared key and/or the PSK. The second authentication information is the check information. If the second authentication information is the same as the first authentication information, it is determined that identity authentication on the first node succeeds.

In some embodiments, if verification on the first identity authentication information fails, the second node may disconnect a communication connection between the second node and the first node or discard the third message, and may further send the second message to the first node again. For example, the first authentication information is generated based on the first shared key. If verification on the first authentication information fails, it indicates that a first shared key in the first node is different from a first shared key of the second node. Therefore, the identity of the first node is untrusted, and the first node may be a node disguised by an attacker. Therefore, the third message is discarded, and the second message is sent to the first node again, to avoid accessing an untrusted node.

Operation S406: The second node sends a fourth message to the first node, where the fourth message includes third authentication information.

It may be understood that the second node sends the fourth message to the first node, and correspondingly, the first node receives the fourth message from the second node. It should be noted that the fourth message may also be referred to as a security context response message.

Operation S407: The first node authenticates an identity of the second node based on the third authentication information.

For example, the third authentication information is determined by the second node based on the first shared key and/or the PSK. Therefore, the first node may also obtain the first shared key and/or the PSK, to check the third authentication information.

In an embodiment, based on a protocol specification, if the second node uses a parameter to generate the third identity authentication information, the first node needs to also use the same parameter to generate check information. If the check information is the same as the third identity authentication information, it is considered that verification succeeds.

For example, because the third authentication information is determined based on the first shared key and/or the PSK, the first node may authenticate the identity of the second node based on the first shared key and/or the PSK and the second authentication information. In some embodiments, the first node may generate fourth authentication information based on the first shared key and/or the PSK. The fourth authentication information is the check information. If the fourth authentication information is the same as the third authentication information, it is determined that identity authentication on the first node succeeds.

In some embodiments, if verification on the third identity authentication information fails, the first node may disconnect the communication connection between the second node and the first node. If verification on the third identity authentication information succeeds, it indicates that the identity of the second node is trusted, and the first node can communicate with the second node.

Operation S408: The first node sends a fifth message to the second node.

In some embodiments, the fifth message indicates, to the second node, that the association has been established, or indicates, to the second node, that access succeeds, or indicates that verification on the identity of the second node succeeds, or the like. Correspondingly, the second node may receive the fifth message from the first node.

Further, the fifth message may be referred to as an association establishment message (which may also be referred to as an association complete message in a given scenario).

In the embodiment shown in FIG. 5, the second node encrypts a first key agreement parameter based on a security parameter (where the security parameter may be a PSK or a password) to obtain a first ciphertext. Because the first node is preconfigured with or may obtain a security parameter that is the same as that of the second node, the first node may decrypt the first ciphertext to obtain the first key agreement parameter, and subsequently may generate a shared key based on the first key agreement parameter. If the security parameter is not obtained, the shared key cannot be generated, and the second node cannot access the first node. Therefore, an attacker can be prevented from accessing the first node via the second node, and the first node can be prevented from being successfully associated with the attacker having an untrusted identity.

The foregoing method embodiments shown in FIG. 4 and FIG. 5 include many possible implementation solutions. The following describes some implementation solutions by using examples with reference to FIG. 6A and FIG. 6B. It should be noted that, for related concepts, operations, or logical relationships that are not explained in FIG. 6A and FIG. 6B, refer to corresponding descriptions in embodiments shown in FIG. 4 and FIG. 5.

FIG. 6A and FIG. 6B are a schematic flowchart of another pairing method according to an embodiment of this application. The method may be implemented based on the architecture shown in FIG. 2. The pairing method may include the following operations.

Operation S701: A first node sends a first message to a second node, where the first message includes indication information of at least one pairing method supported by the first node.

The first message may further include indication information of a key agreement algorithm supported by the first node and indication information of a priority of the key agreement algorithm. For details, refer to the related content in operation S401. Details are not described herein again.

Operation S702: The second node determines a first pairing method from a pairing method supported by both the first node and the second node.

In some embodiments, the second node may determine the first pairing method based on priority information of the at least one pairing method supported by the first node.

In an embodiment, the first message includes the at least one pairing method supported by the first node and the priority information of the at least one pairing method supported by the first node. In this case, the second node may determine, in response to the first message, a pairing method with a highest priority in the pairing method supported by both the first node and the second node as the first pairing method, where a priority is a sequence of the at least one pairing method supported by the first node. For example, the pairing method supported by both the first node and the second node includes a third pairing method, a fifth pairing method, and a sixth pairing method. It is determined, based on the priority indication information carried in the first message, that a priority sequence of the third pairing method is 3, a priority sequence of the fifth pairing method is 5, and a priority sequence of the sixth pairing method is 6. It may be determined that the priority of the third pairing method is the highest, and the second node may determine the third pairing method as the first pairing method.

In another embodiment, the first node and the second node preset priorities of pairing methods, and the second node may determine a pairing method with a highest priority in the pairing method supported by both the first node and the second node as the first pairing method. It should be noted that the priorities, of the pairing methods, preset by the first node and the second node are the same.

In still another embodiment, the second node is an electronic device such as a mobile phone or a pad that has a capability of displaying and receiving a user input. When the second node determines that the pairing method supported by both the first node and the second node includes a plurality of pairing methods, the second node may display the plurality of pairing methods on an interface, so that a user selects one pairing method from the plurality of pairing methods as the first pairing method.

FIG. 7(A), FIG. 7(B), and FIG. 7(C) are a schematic diagram of a human-machine interaction interface according to an embodiment of this application. As shown in FIG. 7(A), FIG. 7(B), and FIG. 7(C), an electronic device may display a user interface 51 shown in (A) in FIG. 7(A), FIG. 7(B), and FIG. 7(C). The user interface 51 includes a plurality of setting options, for example, an airplane mode, Wi-Fi, Bluetooth, and a sound. For example, a user may select Bluetooth 510 through touching (or performing a user operation such as tapping). Correspondingly, the electronic device may display, in response to the user operation, a user interface 52 shown in (B) in FIG. 7(A), FIG. 7(B), and FIG. 7(C). The user interface 52 includes a Bluetooth switch 521, a display bar of an accessible device, and at least one option bar of the accessible device. For example, the user may touch an option bar 522 to select a device 1. In this case, the electronic device may display, in response to the user operation, a user interface 53 shown in (C) in FIG. 7(A), FIG. 7(B), and FIG. 7(C). The user interface 53 includes the device display bar and at least one option bar 531 of a pairing method. Further, the user may touch the option bar 531 to indicate the electronic device to perform pairing with the device 1 according to a pairing method 1.

It should be noted that, when the pairing method supported by both the first node and the second node includes a plurality of pairing methods, in addition to the foregoing embodiment, the second node may alternatively randomly select one of the pairing methods as the first pairing method, or may alternatively have another implementation method. This is not limited herein.

Operation S703: The second node determines a first key agreement algorithm from a key agreement algorithm supported by both the first node and the second node.

In some embodiments, the second node may first obtain a key agreement algorithm supported by the first node, and then determine the first key agreement algorithm from the key agreement algorithm supported by both the first node and the second node.

For example, when the first message includes indication information of the key agreement algorithm supported by the first node, the second node may determine the first key agreement algorithm based on the first message. In some embodiments, the second node may search, from a key agreement algorithm supported by the second node, for an algorithm that is the same as the key agreement algorithm supported by the first node, and then determine the first key agreement algorithm from the key agreement algorithm supported by both the first node and the second node.

In an embodiment, the second node may determine the first key agreement algorithm based on a priority of the key agreement algorithm. In some embodiments, the second node may determine an algorithm with a highest priority in algorithms that are the same as key agreement algorithms supported by the first node as the first key agreement algorithm. For example, the key agreement algorithm supported by both the first node and the second node includes a first algorithm, a second algorithm, and a third algorithm. The first algorithm has a highest priority, and the second node may determine the first algorithm as the first key agreement algorithm. The priority of the key agreement algorithm may be sent by the first node to the second node (where for example, the first message includes priority information of the key agreement algorithm), or may be a priority preconfigured by the second node, or may be priority information obtained according to another method. This is not limited herein.

In another embodiment, the second node may further determine any algorithm from the key agreement algorithm supported by both the first node and the second node as the first key agreement algorithm. This is not limited herein.

Operation S704: The second node generates a first key agreement parameter based on the first key agreement algorithm.

In some embodiments, the key agreement parameter is a parameter determined in a key agreement process. For ease of description, in each embodiment of this application, a key agreement parameter sent by the second node to the first node is referred to as the first key agreement parameter.

In some embodiments, the first key agreement algorithm is a DH algorithm, and the second node may generate the first key agreement parameter based on the DH algorithm. For example, both the first node and the second node have a determined prime number p and a number once g, and the second node may generate a number once a. Then, the second node may determine a calculated value $A = g^{\alpha} \bmod p$, and determine the calculated value A as the first key agreement parameter KEt.

In some other embodiments, the first key agreement algorithm is an ECDH algorithm, and the second node may generate the first key agreement parameter based on the ECDH algorithm. For example, a determined elliptic curve is Ep and a base point is G. The second node may generate a number once a, obtain a calculated value A (where for example, $A = a \times G$) based on the number once a and the base point G, and send the calculated value A to the first node. In this case, the calculated value A may be considered as the first key agreement parameter KEt.

Operation S705: The second node sends a second message to the first node, where the second message includes indication information of the first pairing method.

In some embodiments, after determining the first pairing method, the second node sends the second message to the first node, where the second message includes the indication information of the first pairing method.

In some embodiments, the second message may further include an identity identifier of the second node. The identity identifier of the second node may be an ID of the second node, a media access control (MAC) address, a domain name, a domain address, or another defined identifier, and may also be referred to as a device identifier of the second node.

In some embodiments, the second message may further include a fresh parameter and a pairing method supported by the second node. For ease of description, in each embodiment of this application, the fresh parameter included in the second message is referred to as a first fresh parameter. The fresh parameter includes at least one of a number once, a counter, a serial number, and the like.

In some embodiments, the second message may further include the first key agreement parameter KEt, indication information of the first key agreement algorithm, the identity identifier of the second node, a first number once NONCEg generated by the second node, and a pairing capability of the second node.

It should be noted that the second message may also be referred to as an association request message (or an access request message). In each embodiment of this application, a name of a message or information is not limited, and only content of the message is described and expressed as an example. The name of the message may be randomly replaced.

Operation S706: The first node verifies the first pairing method.

After receiving the second message sent by the second node, the first node may verify the first pairing method, and when verifying that the first pairing method is correct, perform the following operations. For some embodiments of verifying the first pairing method, refer to related content in operation S403. Details are not described herein again.

Operation S707: The first node generates a second key agreement parameter KEg based on the first key agreement algorithm.

The first key agreement algorithm is an agreement algorithm determined by the first node and the second node for use, and may be determined by the second node in operation S703, or may be determined by the first node, or may be an algorithm preconfigured by the first node and the second node. This is not limited herein. In some embodiments, for ease of description, the key agreement parameter sent by the first node to the second node is referred to as the second key agreement parameter.

For example, the first key agreement algorithm is the DH algorithm. Both the first node and the second node have the determined prime number p and the number once g. The first node may generate a number once b. Then, the first node may determine a calculated value B=g b mod p, and determine the calculated value B as the second key agreement parameter KEt.

For details, refer to related content of operation S704 in which the second node generates the second key agreement parameter based on the first key agreement algorithm. Details are not described herein again.

Operation S708: The first node generates first authentication information.

In some embodiments, the first authentication information may be generated based on a shared key or a PSK. The PSK is a secret value shared by the first node and the second node.

The following provides a method for generating the first authentication information by the first node.

FIG. 8 is a schematic flowchart of generating first authentication information according to an embodiment of this application. The method may include some or all content of operations S801 to S804.

Operation S801: The first node obtains a first shared key Kdh based on the first key agreement algorithm and the first key agreement parameter.

The first key agreement algorithm may be a DH algorithm, an ECDH algorithm, a Chinese cryptographic algorithm (such as SM1, SM2, SM3, and SM4), an Oakley algorithm, or the like. This is not limited herein.

For example, if the second message includes the indication information of the first key agreement algorithm and the first key agreement parameter, the first node may determine, in response to the second message, the first shared key based on the first key agreement algorithm and the first key agreement parameter KEt.

In an embodiment, the first key agreement algorithm received by the first node is the DH algorithm, and the first node and the second node share the prime number p. In this case, the first node may generate the number once a, and may further obtain the first shared key Kdh=KEt mod p. For example content, refer to the foregoing detailed content of the DH algorithm above, and details are not described herein again.

In another embodiment, if the first key agreement algorithm received by the first node is the ECDH algorithm, the first node may generate the random integer b, and then may obtain the first shared key Kdh=b×KEt. For example content, refer to detailed content of the ECDH algorithm above, and details are not described herein again.

It may be understood that, in some example designs, the first key agreement algorithm may be encapsulated into a calculation procedure, where an input is the first key agreement parameter, and an output is the first shared key. Certainly, in some other possible designs, operations of determining a private key and calculating an exchange key may be performed in different calculation procedures.

Operation S802: The first node obtains a first key Kgt based on the first shared key, the first number once, and a second number once.

In some embodiments, the second message further includes the first number once, and a formula for obtaining the first key Kgt by the first node may be shown as follows:

$$Kgt=KDF(Kdh,\text{NONCEt},\text{NONCEg})$$

KDF is an inferring algorithm for inferring the first key, NONCEt is the first fresh parameter (such as the first number once, which is an optional parameter), and NONCEg is a second fresh parameter (such as the second number once, which is an optional parameter). It may be understood that "first" and "second" in this application are merely intended to distinguish between parameters, and are not intended to limit parameter names.

Operation S803: The first node determines a password according to the first pairing method.

In some embodiments, the first node may first determine, according to the first pairing method, the password (referred to as a first password below for ease of description) corresponding to the first pairing method. For example, the first pairing method is that a user inputs a same password on the first node and the second node. In this case, the same password input by the user on the first node and the second node is the first password. For another example, the first pairing method is an access password preset by the first node. In this case, the access password of the first node is the first password. Passwords corresponding to different pairing methods may be the same or may be different. This is not limited herein.

Operation S804: The first node determines a pre-shared key based on the password, the first key, the first number once, and the second number once.

For example, a formula for obtaining the pre-shared key PSK by the first node may be shown as follows:

$$PSK=KDF(Kgt,pw,IDt,IDg,NONCEt,NONCEg)$$

KDF is an inferring algorithm for inferring a first intermediate key, pw is the first password, IDg is an identity identifier of the first node, IDt is the identity identifier of the second node, NONCEt is the first fresh parameter, and NONCEg is the second fresh parameter.

It should be noted that the PSK may alternatively be a parameter preconfigured by the first node and the second node.

Operation S805: The first node obtains the first authentication information AUTHg based on the PSK, the first shared key Kdh, and the second number once.

In an embodiment, a formula for generating the first authentication information AUTHg by the first node may be as follows:

$$AUTHg=KDF(PSK,Kdh,NONCEg,second\ message)$$

For the parameters, refer to the foregoing definitions.

It should be noted that inferring algorithms used by the first node to separately generate the first key, the PSK, and the first authentication information in operations S802 to S805 may be different or may be the same. This is not limited herein.

Operation S709: The first node sends a third message to the second node.

In some embodiments, the first node sends the third message to the second node, and correspondingly, the second node receives the third message. The third message may include the first authentication information and the second key agreement parameter.

In some embodiments, the third message may further include the second number once NONCEt and a first message integrity code (Message Integrity Code, MIC). The first MIC is a message integrity code generated based on an integrity protection algorithm, and is for protecting integrity of the third message.

It should be noted that the third message may also be referred to as a security context request message.

Operation S710: The second node authenticates an identity of the first node based on the first authentication information AUTHg.

In some embodiments, after receiving the third message sent by the first node, the second node may obtain the first authentication information in the third message, and authenticate the identity of the first node based on the first authentication information. For example, if the first node generates the first authentication information according to the operations shown in FIG. 8, the second node may generate a second shared key based on the first key agreement algorithm and the second key agreement parameter, and then generate second authentication information based on the second shared key. The second authentication information is check information. When the first authentication information and the second authentication information are equal, the following operations are performed. It should be understood that, if there is no intruder in a process of pairing agreement between the first node and the second node, the first shared key generated by the first node based on the first key agreement algorithm and the second shared key generated by the second node based on the first key agreement algorithm are the same, and the first node and the second node separately generate the first authentication information and the second authentication information in same calculation processes. Therefore, when the first authentication information and the second authentication information are equal, it may be determined that identity authentication on the first node succeeds, and the first node is a trusted node.

For a process in which the second node authenticates the identity of the first node and generates the second authentication information, refer to related content in operation S405 and operation S708. Details are not described herein again.

Operation S711: The second node generates third authentication information.

In some embodiments, after determining that verification on the identity of the first node succeeds in operation S710, the second node may generate the third authentication information based on the third message. The third authentication information is for verifying an identity of the second node.

In an embodiment, the second node may generate the third authentication information based on an inferring algorithm, the second shared key, and the at least one pairing method supported by the first node. The second shared key may be the second shared key generated by the second node in operation S710. In some embodiments, data of the third authentication information generated by the second node may further include the priority of the pairing method.

For example, a formula for calculating the third authentication information by the second node may be as follows:
AUTHt=KDF(PSK, Kdh, first message, NONCEt, key agreement algorithm capability of the first node, pairing capability of the first node, [priority of the pairing method])

|most significant 32 bits

The most significant 32 bits indicate that the most significant 32 bits are reserved for data obtained based on the key derivation algorithm, so as to obtain the third authentication information. It should be noted that, in another embodiment, the priority of the pairing method may not be truncated, or may be truncated to another length. For other parameters, refer to the foregoing definitions.

In some embodiments, the third message received by the second node may further include the first MIC and the first authentication information. The second node may first verify integrity of the first message based on the first MIC; when verification on the integrity of the third message succeeds, verify the identity of the second node based on the third authentication information; and when identity authentication on the second node succeeds, generate the third authentication message based on the third message. Otherwise, the second node discards the third message.

Operation S712: The first node sends a fourth message to the second node.

In some embodiments, after receiving the third message of the second node, the first node may send the fourth message to the second node after performing operations S710 and S711 in response to the third message. The fourth message may include the third authentication information. In some embodiments, the fourth message may further include a second MIC, and the second MIC is a message integrity code generated based on an integrity protection algorithm, and is for protecting integrity of the fourth message.

In some other embodiments, the third message received by the first node includes the first MIC and the first authentication information. In this case, the second node may first verify the integrity of the first message based on the first MIC, and verify the identity of the second node based on the first authentication information when verification on the integrity of the first message succeeds. Further, when identity authentication on the second node succeeds, the first node generates the third authentication message based on the first message, and finally sends the fourth message to the second node, where the fourth message includes the third authentication information.

It may be understood that, assuming that an attacker tampers with a message, a parameter for calculating authentication information changes, and consequently authentication fails. After the authentication fails, a connection is disconnected, and the second node sends the second message to the first node again.

It should be noted that the fourth message may also be referred to as a security context response message.

To ensure security of data transmission and data storage in a communication process, integrity protection (or integrity protection for short) needs to be performed on data. The integrity protection on data may be performed in a manner of calculating a message integrity code based on an integrity protection algorithm, where the message integrity code is a small segment of information generated based on an algorithm, and is for checking message integrity. The integrity protection algorithm may be for: performing integrity protection on some or all communication information between the first node and the second node based on a key corresponding to the integrity protection algorithm, or verifying integrity of some or all communication information between the first node and the second node based on a key corresponding to the integrity protection algorithm.

Operation S713: The first node authenticates the identity of the second node based on the third authentication information AUTHg.

In some embodiments, the fourth message received by the first node from the second node includes the third authentication information, and the second node may authenticate the identity of the second node based on the third authentication information in response to the fourth message. Further, after it is determined that identity authentication on the second node succeeds, an association with the second node is established.

In some other embodiments, the fourth message includes the third authentication information and further includes the second MIC. In this case, the first node may first verify the second MIC, authenticate the identity of the second node based on the third authentication information AUTHt when verification on the integrity of the message succeeds, and establish the association with the second node when determining that identity authentication on the second node succeeds.

The first node may generate fourth authentication information according to a method for generating the third authentication information by the second node, where the fourth authentication information is check information of the third authentication information. When the third authentication information is the same as the fourth authentication information, it is determined that identity authentication on the first node succeeds. For example content of authenticating the identity of the second node by the first node, refer to related content in operation S407 and operation S711. Details are not described herein again.

When the second authentication information and the first authentication information are equal, the first node may perform a first operation of the first pairing method, so that the second node establishes the association with the second node when performing a second operation of the first pairing method.

FIG. 9 is a schematic diagram of a pairing method according to an embodiment of this application. As shown in FIG. 9, Method 1 to Method 6 are examples of six pairing methods in this embodiment of this application. Method x may include the foregoing six pairing methods, or may be another pairing manner. This is not limited herein. In FIG. 9, a node A represents a node that has both a keyboard input capability and a display output capability, a node B represents a node that has both a button input capability and a display output capability, a node C represents a node that has a keyboard input capability and has no display capability, a node D represents a node that has a button input capability and has no display capability, and a node E represents a node that has no input capability and no display capability.

As shown in FIG. 9, both a first operation and a second operation of a pairing method in Method 1 are inputting a password 1, and the password 1 may be a password preconfigured or input by a user. For example, both the first node and the second node are mobile phones. When the first pairing method is Method 1, the user may input a same password on the first node and the second node respectively, so as to establish the association between the first node and the second node.

A first operation corresponding to a pairing method in Method 2 is displaying a password 2, and a second operation is receiving the password 2, where the password 2 may be a preset password. For example, the first node is a mobile phone, and the second node is a band. When the first pairing method is Method 2, the band displays the password 2, and the user may input the password 2 into the mobile phone. Correspondingly, the mobile phone receives the password 2, so that the first node accesses the second node.

A first operation corresponding to a pairing method in Method 3 is receiving a password 3, and a second operation is receiving the password 3, where the password 3 may be a preset password. For example, the first node is a mobile phone, and the second node is a router. When the first pairing method is Method 3, the mobile phone may display the password 3, and the user inputs the password 3 on the router, so that the mobile phone can establish an association with the router.

A first operation corresponding to a pairing method in Method 4 is no operation, and a second operation is receiving a password 4, where the password 4 is a preset password for connecting to the first node. For example, the first node is a new smartphone, the second node is a vehicle, and the password 4 is a password configured by a vehicle owner for the vehicle through an administrator interface. When the first pairing method is Method 4, the password 4 may be input into the new smartphone, and the smartphone may request to access the vehicle based on the input password.

A first operation corresponding to a pairing method in Method 5 is receiving a password and a second operation is no operation, where the password 5 is a preset password for connecting to the second node. For example, the first node is a headset, and the second node is a mobile phone. When the first pairing method is Method 5, the user inputs the password 5 on the mobile phone, and the mobile phone may establish an association with the headset.

A first operation corresponding to a pairing method in Method 6 is displaying a password 6 and receiving the password 6, and a second operation is displaying the password 6 and receiving the password 6, where the password 6 may be a password agreed on by the first node and the second node. For example, both the first node and the second node are mobile phones. When the first pairing method is Method 6, both the two mobile phones display the password 6. The user separately inputs the password 6 on the two mobile phones, and the two mobile phones can establish an association.

Operation S714: The first node sends a fifth message to the second node.

In some embodiments, the fifth message indicates, to the second node, that the association has been established, or indicates, to the second node, that access succeeds, or indicates that verification on the identity of the second node succeeds, or the like. Correspondingly, the second node may receive the fifth message from the first node.

Further, the fifth message may be referred to as an association establishment message (which may also be referred to as an association complete message in an example scenario).

It should be noted that, in the foregoing embodiment, the indication information of the at least one pairing method supported by the first node may be an input/output capability of the first node, and the second node may determine the first pairing method based on the input/output capability of the first node; and indication information of at least one pairing method supported by the second node may be an input/output capability of the second node, and the first node may determine the second pairing method based on the input/output capability of the second node. Refer to FIG. 9. For example, the first node may determine, based on the input/output capabilities of the second node and the first node, the pairing method supported by both the first node and the second node, and further determine the first pairing method from the pairing method supported by both the first node and the second node. For example operations of the pairing method, refer to related content in the foregoing embodiment. Details are not described herein again.

The methods in embodiments of this application are described in detail above, and apparatuses in embodiments of this application are provided below.

FIG. 10 is a schematic diagram of a structure of a pairing apparatus 100 according to an embodiment of this application. The apparatus 100 may be a node, and may be referred to as a first node for ease of description. Certainly, the apparatus 100 may alternatively be a component, such as a chip or an integrated circuit in the first node. The apparatus 100 may include a sending unit 1001 and a receiving unit 1002. The pairing apparatus 100 is configured to implement the foregoing pairing method, for example, the pairing method in any embodiment shown in FIG. 4, FIG. 5, or FIG. 6A and FIG. 6B.

In a possible embodiment, the sending unit 1001 is configured to send a first message, where the first message includes indication information of at least one pairing method supported by the first node.

The receiving unit 1002 is configured to receive a second message from a second node, where the second message includes indication information of a first pairing method, and the first pairing method is included in a pairing method supported by both the first node and the second node.

In embodiments of this application, the first node and the second node support one or more pairing methods, and the second node may determine the first pairing method from the pairing method supported by both the first node and the second node, so that the first node and the second node can perform pairing according to the first pairing method. According to this application, the first node and the second node may determine the first pairing method through agreement based on different application scenarios, so that a plurality of selections of a pairing method between the two nodes are provided, thereby improving flexibility of pairing between the nodes.

In a possible embodiment, the second message is for requesting to establish an association with the first node.

In a possible embodiment, the first message further includes priority information corresponding to the at least one pairing method supported by the first node, or a priority corresponding to the at least one pairing method is preconfigured.

In a possible embodiment, the first pairing method is determined based on the priority information of the at least one pairing method supported by the first node.

In a possible embodiment, the second message further includes indication information of at least one pairing method supported by the second node.

In a possible embodiment, the apparatus further includes a processing unit 1003, and the processing unit 1003 is configured to determine whether to use the first pairing method to establish an association with the second node.

The sending unit 1001 is further configured to: when determining not to use the first pairing method to establish the association with the second node, send a rejection message to the second node, where the rejection message indicates that a pairing method is incorrectly selected.

In a possible embodiment, the processing unit 1003 is configured to:

determine a second pairing method from the pairing method supported by both the first node and the second node; and when the first pairing method and the second pairing method are not a same pairing method, determine not to use the first pairing method to establish the association with the second node.

In a possible embodiment, the rejection message includes indication information indicating the second pairing method.

In a possible embodiment, the second message further includes indication information of a first key agreement algorithm and a first key agreement parameter, and the first key agreement parameter is generated by the second node based on the first key agreement algorithm.

The sending unit 1001 is further configured to send a third message to the second node, where the third message includes first authentication information and a second key agreement parameter, the second key agreement parameter is obtained by the first node based on the first key agreement algorithm, the first authentication information is obtained by the first node based on a first shared key, and the first shared key is determined by the first node based on the first key agreement algorithm and the first key agreement parameter.

The receiving unit 1002 is further configured to receive a fourth message from the second node, where the fourth message is sent to the first node by the second node when the second node verifies that the first authentication information is consistent with second authentication information, the second authentication information is obtained by the second node based on a second shared key, and the second shared key is obtained by the second node based on the first key agreement algorithm and the second key agreement parameter.

In a possible embodiment, the fourth message includes third authentication information, the third authentication information is obtained by the second node based on the second shared key, and the processing unit 1003 is further configured to:

when verifying that the third authentication information is consistent with fourth authentication information, determine that identity authentication on the second node succeeds, where the fourth authentication information is obtained by the first node based on the first shared key.

In a possible embodiment, the third authentication information is generated by the second node based on an inferring algorithm, the second shared key, and the at least one pairing method supported by the first node, and the processing unit 1003 is further configured to:

generate the fourth authentication information based on the inferring algorithm, the first shared key, and the at least one pairing method supported by the first node.

In a possible embodiment, the first message further includes indication information of a key agreement algorithm supported by the first node, and the indication information of the key agreement algorithm supported by the first node is used by the second node to: determine the first key agreement algorithm from a key agreement algorithm supported by both the first node and the second node and determine the first key agreement parameter based on the first key agreement algorithm.

In a possible embodiment, the second message further includes a first number once, and the processing unit 1003 is configured to:

obtain a first key through inferring based on the first shared key, the first number once, and a second number once, where the second number once is generated by the first node;

determine a password according to the first pairing method;

determine a pre-shared key PSK between the first node and the second node based on the password, the first key, the first number once, and the second number once; and generate the first authentication information based on the PSK, the first shared key, and the first number once.

In a possible embodiment, the processing unit 1003 is further configured to obtain a first message integrity code MIC based on the third message, where the first MIC is configured to verify integrity of the third message.

The sending unit 1001 is further configured to send the first MIC to the second node, so that the second node generates the first authentication message when verification on the integrity of the third message based on the first MIC succeeds.

The processing unit 1003 is further configured to: when verification on integrity of the fourth message based on a second MIC succeeds, establish an association with the second node according to the first pairing method, where the fourth message includes the second MIC, and the second MIC is obtained by the second node based on the fourth message.

In a possible embodiment, the indication information of the at least one pairing method supported by the first node is an input/output capability of the first node.

In a possible embodiment, the first pairing method is selected by a user of the second node in the pairing method supported by both the first node and the second node.

In a possible embodiment, the first message may alternatively be broadcast by the first node to the second node. The second message is also referred to as an access request message (or an association request message). Further, the third message may also be referred to as a security context request message (or an identity authentication request message). The fourth message may also be referred to as a security context response message (or an identity authentication response message).

In a possible embodiment, the method further includes:

sending a fifth message to the second node, where the fifth message indicates that access succeeds, or indicates that the association is complete. Further, the fifth message may be referred to as an association establishment message (or an access association complete message), an association complete message, or the like.

It should be noted that, for an implementation of each unit, refer to the corresponding descriptions of the embodiment shown in FIG. 4 or FIG. 6A and FIG. 6B. The pairing apparatus 100 may be the first node in the embodiment shown in FIG. 4 or FIG. 6A and FIG. 6B.

It may be understood that, in the apparatus embodiments of this application, division into a plurality of units or modules is merely logical division based on functions, and is not intended to limit a structure of the apparatus. In some embodiments, some functional modules may be subdivided into more functional modules that are smaller, and some functional modules may also be combined into one functional module. However, regardless of whether these functional modules are subdivided or combined, a general procedure performed by the apparatus 100 in a pairing process is the same. For example, the receiving unit 1002 and the sending unit 1001 in the apparatus 100 may also be integrated into a communication unit, and the communication unit may implement functions implemented by the receiving unit 1002 and the sending unit 1001. Usually, each unit corresponds to respective program code (or program instructions). When the program code corresponding to the unit is run on a processor, the unit is controlled by the processing unit 1003 to perform a corresponding procedure to implement a corresponding function.

FIG. 11 is a schematic diagram of a structure of a pairing apparatus 110 according to an embodiment of this application. The apparatus 110 may be a node, and may be referred to as a second node for ease of description. Certainly, the apparatus 110 may alternatively be a component such as a chip or an integrated circuit in the first node. The apparatus 110 may include a receiving unit 1101, a processing unit 1102, and a sending unit 1103. The pairing apparatus 110 is configured to implement the foregoing pairing method, for example, the pairing method in any embodiment shown in FIG. 7(A), FIG. 7(B), and FIG. 7(C), FIG. 6A and FIG. 6B, or FIG. 8.

In a possible embodiment, the receiving unit 1101 is configured to receive a first message from a first node, where the first message includes indication information of at least one pairing method supported by the first node.

The processing unit 1102 is configured to determine a first pairing method from a pairing method supported by both the first node and the second node.

The sending unit 1103 is configured to send a second message to the second node, where the second message includes the first pairing method.

In a possible embodiment, the second message is for requesting to establish an association with the first node.

In a possible embodiment, the first message further includes priority information corresponding to the at least one pairing method supported by the first node, or a priority corresponding to the at least one pairing method is preconfigured.

In a possible embodiment, the processing unit 1102 is configured to:

determine, based on the priority information of the at least one pairing method supported by the first node, the first pairing method from the pairing method supported by both the first node and the second node.

In a possible embodiment, the second message further includes indication information of at least one pairing method supported by the second node.

In a possible embodiment, the receiving unit 1101 is further configured to:

receive a rejection message from the first node, where the rejection message indicates that a pairing method is incorrectly selected, and the rejection message is sent to the second node when the first node determines not to use the first pairing method to establish an association with the second node.

In a possible embodiment, the rejection message includes indication information indicating a second pairing method.

In a possible embodiment, the second pairing method is determined by the first node from the pairing method supported by both the first node and the second node, and the second pairing method is used by the first node to determine, when the first pairing method and the second pairing method are not a same pairing method, not to use the first pairing method to establish the association with the second node.

In a possible embodiment, the second message further includes indication information of a first key agreement algorithm and a first key agreement parameter, and the first key agreement parameter is generated by the second node based on the first key agreement algorithm.

The receiving unit 1101 is further configured to receive a third message from the first node, where the third message includes first authentication information and a second key agreement parameter, the second key agreement parameter is obtained by the first node based on the first key agreement algorithm, the first authentication information is obtained by the first node based on a first shared key, and the first shared key is determined by the first node based on the first key agreement algorithm and the first key agreement parameter.

The sending unit 1103 is further configured to send a fourth message to the second node, where the fourth message is sent to the first node by the second node when the second node verifies that the first authentication information is consistent with second authentication information, the second authentication information is obtained by the second node based on a second shared key, and the second shared key is obtained by the second node based on the first key agreement algorithm and the second key agreement parameter.

In a possible embodiment, the fourth message includes third authentication information, the third authentication information is obtained by the second node based on the second shared key, the third authentication information is used by the first node to determine, when the first node verifies that the third authentication information is consistent with fourth authentication information, that identity authentication on the second node succeeds, and the fourth authentication information is obtained by the first node based on the first shared key.

In a possible embodiment, the processing unit 1102 is configured to:

generate the third authentication information based on an inferring algorithm, the second shared key, and the at least one pairing method supported by the first node, where the fourth authentication information is generated based on the inferring algorithm, the first shared key, and the at least one pairing method supported by the first node.

In a possible embodiment, the first message further includes indication information of a key agreement algorithm supported by the first node, and the indication information of the key agreement algorithm supported by the first node is used by the second node to: determine the first key agreement algorithm from a key agreement algorithm supported by both the first node and the second node and determine the first key agreement parameter based on the first key agreement algorithm.

In a possible embodiment, the second message further includes a first number once, and the processing unit 1102 is configured to:

obtain a first key through inferring based on the second shared key, the first number once, and a second number once, where the second number once is generated by the first node;

determine a password according to the first pairing method;

determine a pre-shared key PSK between the first node and the second node based on the password, the first key, the first number once, and the second number once; and generate the second authentication information based on the PSK, the second shared key, and the first number once.

In a possible embodiment, the receiving unit 1101 is further configured to receive a first message integrity code MIC from the first node, where the first MIC is obtained by the first node based on the third message, and the first MIC is for verifying integrity of the third message.

The processing unit 1102 is further configured to generate the first authentication message when verification on the integrity of the third message based on the first MIC succeeds.

The processing unit 1102 is further configured to obtain a second MIC based on the fourth message, where the fourth message includes the second MIC, so that when verification on integrity of the fourth message based on the second MIC succeeds, the first node establishes the association with the second node according to the first pairing method.

In a possible embodiment, the indication information of the at least one pairing method supported by the first node is an input/output capability of the first node.

In a possible embodiment, the first pairing method is selected by a user of the second node in the pairing method supported by both the first node and the second node.

It should be noted that, for an implementation of each unit, refer to the corresponding descriptions of the embodiment shown in FIG. 4 or FIG. 6A and FIG. 6B. The pairing apparatus 110 may be the second node in the embodiment shown in FIG. 4 or FIG. 6A and FIG. 6B.

FIG. 12 is a schematic diagram of a structure of a pairing apparatus 120 according to an embodiment of this application. The pairing apparatus 120 may be a node, or may be a component such as a chip or an integrated circuit in the node. The apparatus 120 may include at least one processor 1202 and a communication interface 1204. Further, in some embodiments, the pairing apparatus may further include at least one memory 1201. Further in some embodiments, the apparatus may further include a bus 1203. The memory 1201, the processor 1202, and the communication interface 1204 are connected through the bus 1203.

The memory 1201 is configured to provide storage space, and the storage space may store data such as an operating system and a computer program. The memory 1201 may be one or a combination of a random access memory (RAM), a read-only memory (ROM), an erasable programmable read-only memory (EPROM), a compact disc read-only memory (CD-ROM), or the like.

The processor 1202 is a module that performs an arithmetic operation and/or a logic operation, and may be one or a combination of a plurality of processing modules such as a central processing unit (CPU), a graphics processing unit (GPU), a microprocessor unit (MPU), an application-specific integrated circuit (ASIC), a field programmable gate array (FPGA), a complex programmable logic device (CPLD), a coprocessor (assisting the central processing unit in completing corresponding processing and application), and a microcontroller unit (MCU).

The communication interface 1204 may be configured to provide an information input or output for the at least one processor. Alternatively, the communication interface may be configured to receive data sent from an outside and/or send data to the outside, and may be a wired link interface including an ethernet cable and the like, or may be a wireless link (Wi-Fi, Bluetooth, universal wireless transmission, an in-vehicle short-distance communication technology, or the like) interface. In some embodiments, the communication interface 1204 may further include a transmitter (for example, a radio frequency transmitter or an antenna), a receiver, or the like coupled to the interface.

The processor 1202 in the apparatus 120 is configured to read the computer program stored in the memory 1201, and is configured to perform the foregoing pairing method, for example, the pairing method described in the embodiment shown in FIG. 7(A), FIG. 7(B), and FIG. 7(C), FIG. 6A and FIG. 6B, or FIG. 8.

In a design, the pairing apparatus 120 may be the first node in the embodiment shown in FIG. 7(A), FIG. 7(B), and FIG. 7(C), FIG. 6A and FIG. 6B, or FIG. 8. The processor 1202 in the apparatus 120 is configured to read the computer program stored in the memory 1201, to perform the method embodiment shown in FIG. 4 or FIG. 6A and FIG. 6B. The pairing apparatus 100 may be the first node in the embodiment shown in FIG. 4 or FIG. 6A and FIG. 6B.

In another design, the pairing apparatus 120 may be the second node in the embodiment shown in FIG. 4, FIG. 5, or FIG. 6A and FIG. 6B. The processor 1202 in the apparatus 120 is configured to read the computer program stored in the memory 1201, to perform the method embodiment shown in FIG. 4 or FIG. 6A and FIG. 6B. The pairing apparatus 110 may be the second node in the embodiment shown in FIG. 4 or FIG. 6A and FIG. 6B.

For specific embodiment, refer to detailed descriptions in the embodiment shown in FIG. 7(A), FIG. 7(B), and FIG. 7(C), FIG. 6A and FIG. 6B, or FIG. 8, and details are not described herein again.

An embodiment of this application further provides a computer-readable storage medium. The computer-readable storage medium stores a computer program. When the computer program is run on one or more processors, the method in the embodiment shown in FIG. 7(A), FIG. 7(B), and FIG. 7(C), FIG. 6A and FIG. 6B, or FIG. 8 is implemented.

An embodiment of this application further provides a chip system. The chip system includes at least one processor and a communication interface. The communication interface is configured to send and/or receive data. The at least one processor is configured to invoke a computer program stored in at least one memory, to implement the method in the embodiment shown in FIG. 4, FIG. 5, or FIG. 6A and FIG. 6B.

Further, the at least one processor may include at least one of a CPU, an MPU, an MCU, or a coprocessor.

An embodiment of this application further provides a terminal. The terminal may be an intelligent cockpit product, a vehicle, or the like. The terminal includes a first node and/or a second node. The first node (such as one or more of modules such as a camera, a screen, a microphone, an acoustics, a radar, an electronic key, a keyless entrance and startup system controller, and a user equipment UE) is the first node in the embodiment shown in FIG. 7(A), FIG. 7(B), and FIG. 7(C), FIG. 6A and FIG. 6B, or FIG. 8. The second node (for example, a base station or a car cabin domain controller CDC) is the second node in the embodiment shown in FIG. 7(A), FIG. 7(B), and FIG. 7(C), FIG. 6A and FIG. 6B, or FIG. 8.

Further, In some embodiments, the terminal may be a drone, a robot, a device in a smart home scenario, a device in a smart manufacturing scenario, or the like.

An embodiment of this application further provides a computer program product. When the computer program product runs on one or more processors, the communication method described in the embodiment shown in FIG. 4, FIG. 5, or FIG. 6A and FIG. 6B may be implemented.

All or some of the foregoing embodiments may be implemented by software, hardware, firmware, or any combination thereof.

When software is used to implement embodiments, all or some of embodiments may be implemented in a form of a computer instruction product.

When computer instructions are loaded and executed on a computer, all or some of the procedures or functions according to embodiments of this application can be implemented. The computer may be a general-purpose computer, a dedicated computer, a computer network, or another programmable apparatus. The computer instructions may be stored in a computer-readable storage medium, or may be transmitted via a computer-readable storage medium. The computer-readable storage medium may be any usable medium accessible by the computer, or may be a data storage device, such as a server or a data center that integrates one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Sequence adjustment, combination, and deletion may be performed on the operations in the method embodiments of this application based on an actual requirement.

Combination, division, and deletion may be performed on the modules in the apparatus embodiments of this application based on an actual requirement.

What is claimed is:

1. A pairing method, comprising:

sending, by a first node, a first message, wherein the first message comprises indication information of at least one pairing method supported by the first node; and receiving, by the first node, a second message from a second node, wherein the second message comprises indication information of a first pairing method, and the first pairing method is a pairing method supported by
both the first node and the second node;

receiving, by the first node, a fourth message from the
second node, wherein the fourth message comprises
third authentication information, the third authentica-
tion information is obtained by the second node based
on an inferring algorithm, a second shared key, and the
at least one pairing method supported by the first node;

wherein the second shared key is obtained by the second
node based on a first key agreement algorithm and a
second key agreement parameter, the second key agree-
ment parameter is generated by the first node based on
the first key agreement algorithm;

generating, by the first node, fourth authentication infor-
mation based on the inferring algorithm, a first shared
key, and the at least one pairing method supported by
the first node;

wherein the first shared key is obtained by the first node
based on the first key agreement algorithm and a first
key agreement parameter, the first key agreement
parameter is generated by the second node based on the
first key agreement algorithm;

determining, by the first node, that identity authentication
on the second node succeeds by verifying that the third
authentication information is consistent with fourth
authentication information;

wherein the first key agreement algorithm is determined
from a key agreement algorithm supported by both the
first node and the second node.

2. The method according to claim 1, wherein the second
message is for requesting to establish an association with the
first node.

3. The method according to claim 1, wherein the first
message further comprises priority information correspond-
ing to the at least one pairing method supported by the first
node, or a priority corresponding to the at least one pairing
method is preconfigured.

4. The method according to claim 3, wherein the first
pairing method is determined based on the priority infor-
mation of the at least one pairing method supported by the
first node.

5. The method according to claim 1, wherein the indica-
tion information of the at least one pairing method supported
by the first node is an input/output capability of the first
node.

6. The method according to claim 1, wherein the inferring
algorithm is a key derivation algorithm.

7. The method according to claim 1, wherein the first key
agreement algorithm a Diffie-Hellman key exchange (DH)
algorithm, an elliptic curve cryptosystems-based DH
(ECDH) algorithm, a Chinese cryptographic algorithm, or
an Oakley algorithm.

8. The method according to claim 1, wherein the fourth
message further comprises a second message integrity code
(MIC), wherein the second MIC is a message integrity code
generated based on an integrity protection algorithm, and the
second MIC is for protecting integrity of the fourth message.

9. A pairing method, comprising:

receiving, by a second node, a first message from a first
node, wherein the first message comprises indication
information of at least one pairing method supported by
the first node;

determining, by the second node, a first pairing method,
and the first pairing method is a pairing method sup-
ported by both the first node and the second node; and sending, by the second node, a second message to the first
node, wherein the second message comprises indica-
tion information of the first pairing method;

sending, by the second node, a fourth message to the first
node, wherein the fourth message comprises third
authentication information, the third authentication
information is obtained by the second node based on an
inferring algorithm, a second shared key, and the at
least one pairing method supported by the first node;

wherein the second shared key is obtained by the second
node based on a first key agreement algorithm and a
second key agreement parameter, the second key agree-
ment parameter is generated by the first node based on
the first key agreement algorithm;

wherein the first key agreement algorithm is determined
from a key agreement algorithm supported by both the
first node and the second node.

10. The method according to claim 9, wherein the second
message is for requesting to establish an association with the
first node.

11. The method according to claim 9, wherein the first
message further comprises priority information correspond-
ing to the at least one pairing method supported by the first
node, or a priority corresponding to the at least one pairing
method is preconfigured.

12. The method according to claim 11, wherein the first
pairing method is determined based on the priority infor-
mation of the at least one pairing method supported by the
first node.

13. The method according to claim 9, wherein the indi-
cation information of the at least one pairing method sup-
ported by the first node is an input/output capability of the
first node.

14. The method according to claim 9, wherein the infer-
ring algorithm is a key derivation algorithm.

15. The method according to claim 9, wherein the first key
agreement algorithm a Diffie-Hellman key exchange (DH)
algorithm, an elliptic curve cryptosystems-based DH
(ECDH) algorithm, a Chinese cryptographic algorithm, or
an Oakley algorithm.

16. The method according to claim 9, wherein the fourth
message further comprises a second message integrity code
(MIC), wherein the second MIC is a message integrity code
generated based on an integrity protection algorithm, and the
second MIC is for protecting integrity of the fourth message.

17. An apparatus operating as part of a first node, com-
prising:

at least one processor; and one or more memories coupled to the at least one pro-
cessor and storing programming instructions for execu-
tion by the at least one processor to:

send a first message, wherein the first message comprises
indication information of at least one pairing method
supported by the first node; and receive a second message from a second node, wherein
the second message comprises indication information
of a first pairing method, and the first pairing method is
a pairing method supported by both the first node and
the second node;

receiving a fourth message from the second node, wherein
the fourth message comprises third authentication
information, the third authentication information is
obtained by the second node based on an inferring
algorithm, a second shared key, and the at least one
pairing method supported by the first node;

wherein the second shared key is obtained by the second
node based on a first key agreement algorithm and a second key agreement parameter, the second key agreement parameter is generated by the first node based on the first key agreement algorithm;

generating fourth authentication information based on the inferring algorithm, a first shared key, and the at least one pairing method supported by the first node;

wherein the first shared key is obtained by the first node based on the first key agreement algorithm and a first key agreement parameter, the first key agreement parameter is generated by the second node based on the first key agreement algorithm;

determining that identity authentication on the second node succeeds by verifying that the third authentication information is consistent with fourth authentication information;

wherein the first key agreement algorithm is determined from a key agreement algorithm supported by both the first node and the second node.

18. The apparatus according to claim 17, wherein the second message is for requesting to establish an association with the first node.

19. The apparatus according to claim 17, wherein the first message further comprises priority information corresponding to the at least one pairing method supported by the first node, or a priority corresponding to the at least one pairing method is preconfigured.

\* \* \* \* \*